(12) United States Patent
Yang et al.

(10) Patent No.: US 12,376,113 B2
(45) Date of Patent: Jul. 29, 2025

(54) FREQUENCY HOPPING FOR PHYSICAL UPLINK SHARED CHANNEL (PUSCH) COMMUNICATIONS

(71) Applicant: Apple Inc., Cupertino, CA (US)

(72) Inventors: Weidong Yang, San Diego, CA (US); Amir Farajidana, Sunnyvale, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Jie Cui, San Jose, CA (US); Oghenekome Oteri, San Diego, CA (US); Ruoheng Liu, San Diego, CA (US); Wei Zeng, Saratoga, CA (US); Yang Tang, San Jose, CA (US); Yuchul Kim, San Jose, CA (US); Yushu Zhang, Beijing (CN)

(73) Assignee: APPLE INC., Cupertino, CA (US)

(*) Notice: Subject to any disclaimer, the term of this patent is extended or adjusted under 35 U.S.C. 154(b) by 313 days.

(21) Appl. No.: 17/799,603

(22) PCT Filed: Feb. 12, 2020

(86) PCT No.: PCT/CN2020/074957
§ 371 (c)(1),
(2) Date: Aug. 12, 2022

(87) PCT Pub. No.: WO2021/159356
PCT Pub. Date: Aug. 19, 2021

(65) Prior Publication Data
US 2023/0068475 A1 Mar. 2, 2023

(51) Int. Cl.
*H04W 72/04* (2023.01)
*H04L 1/08* (2006.01)
(Continued)

(52) U.S. Cl.
CPC ............... *H04W 72/21* (2023.01); *H04L 1/08* (2013.01); *H04L 5/0012* (2013.01); *H04W 72/0453* (2013.01)

(58) Field of Classification Search
CPC ....... H04L 1/08; H04L 5/0023; H04L 5/0044; H04L 5/0012; H04L 5/0091; H04W 72/0453; H04W 72/21
See application file for complete search history.

(56) References Cited

U.S. PATENT DOCUMENTS

2018/0270853 A1 9/2018 Hosseini et al.
2020/0383105 A1* 12/2020 Park ...................... H04L 1/1896
(Continued)

FOREIGN PATENT DOCUMENTS

| CN | 101515846 A | 8/2009 |
| CN | 101686560 A | 3/2010 |
| WO | WO 2018080641 A1 | 5/2018 |

OTHER PUBLICATIONS

International Search Report and Written Opinion directed to related International Application No. PCT/CN2020/074957, mailed Nov. 18, 2020; 8 pages.
(Continued)

*Primary Examiner* — Brian D Nguyen
(74) *Attorney, Agent, or Firm* — STERNE, KESSLER, GOLDSTEIN & FOX P.L.L.C.

(57) ABSTRACT

Some embodiments include an apparatus, method, and computer program product for facilitating frequency hopping for physical uplink shared channel (PUSCH) communications in 5G wireless communication systems. When inter-slot and/or inter-repetition frequency hopping is used, user equipment (UE) may transmit a first portion of symbols in a first slot using a first transmission frequency indicated by a frequency domain resource allocation. The UE may transmit a second portion of symbols in a second slot using a
(Continued)

second offset frequency. When intra-repetition frequency hopping is used and the symbols are segmented, the UE may disable the intra-repetition frequency hopping and transmit the segmented portion of symbols using a particular transmission frequency indicated by the frequency domain resource allocation. When intra-repetition frequency hopping is used and the symbols are non-segmented, the UE may apply frequency hopping to divide a portion of symbols for transmission within a repetition.

20 Claims, 14 Drawing Sheets

(51) Int. Cl.
    *H04L 5/00*           (2006.01)
    *H04W 72/0453*    (2023.01)
    *H04W 72/21*       (2023.01)

(56) References Cited

U.S. PATENT DOCUMENTS

| | | | |
|---|---|---|---|
| 2021/0282137 A1* | 9/2021 | Wang | H04W 72/23 |
| 2022/0191846 A1* | 6/2022 | Ren | H04L 1/08 |
| 2022/0369297 A1* | 11/2022 | Takahashi | H04L 5/0048 |
| 2023/0029850 A1* | 2/2023 | Park | H04L 1/1854 |
| 2024/0040563 A1* | 2/2024 | Choi | H04L 5/0053 |

OTHER PUBLICATIONS

Extended European Search Report directed to related European Application No. 20918422.5, mailed Jul. 3, 2023; 8 pages.
Apple Inc., "Remaining issues on PUSCH enhancements," R1-1912818, 3GPP TSG RAN WG1 #99, Nov. 9, 2019; 3 pages.
ZTE., "PUSCH enhancements for NR URLLC," 3GPP TSG RAN WGJ #98bis, R1-1910102, Oct. 8, 2019; 11 pages.
Nokia, Nokia Shanghai Bell, "Remaining details on PUSCH hopping procedure," 3GPP TSG-RAN WG1 #NR1801, R1-1800940, Jan. 12, 2018; 5 pages.
Vivo, "PUSCH enhancements for URLLC," 3GPP TSG RAN WG1 #99, R1-1912032, Nov. 9, 2019; 6 pages.
3GPP TR 38.913, 3rd Generation Partnership Project; Technical Specification Group Radio Access Network; Study on Scenarios and Requirements for Next Generation Access Technologies; (Release 14), Jun. 2017; 39 pages.
Huawei et al., "New SID on Physical Layer Enhancements for NR Ultra-Reliable and Low Latency Communication (URLLC)", 3GPP TSG-RAN#81, RP-182089, Gold Coast, Australia, Sep. 10-13, 2018; 5 pages.
Huawei et al., "New WID: Physical Layer Enhancements for NR Ultra-Reliable and Low Latency Communication (URLLC)", 3GPP TSG RAN Meeting #83, RP-190726, Shenzhen, China, Mar. 18-21, 2019; 5 pages.

* cited by examiner

FREQUENCY HOPPING FOR PHYSICAL UPLINK SHARED CHANNEL (PUSCH) COMMUNICATIONS

CROSS REFERENCE TO RELATED PATENT APPLICATIONS

This application is a U.S. National Phase of International Application No. PCT/CN2020/074957, filed Feb. 12, 2020, which is hereby incorporated by reference in its entirety.

BACKGROUND

Various embodiments generally may relate to the field of wireless communications.

SUMMARY

Some embodiments of this disclosure include apparatuses and methods for facilitating frequency hopping for physical uplink shared channel (PUSCH) communications.

In some embodiments, a method for facilitating intra-repetition frequency hopping for PUSCH communications may include receiving a frequency domain resource allocation indicating a transmission frequency and an offset frequency. The method may include identifying a dataset having symbols using a Physical Uplink Shared Channel (PUSCH) transmission scheme and identifying that the PUSCH transmission scheme indicates usage of intra-repetition frequency hopping. The method may include determining that the symbols are non-segmented. In response to the determining, the method may include dividing the symbols into a first divided portion and a second divided portion for intra-repetition frequency hopping. The method may include transmitting the first divided portion of symbols in a transmission repetition using the transmission frequency and transmitting the second divided portion of symbols in the transmission repetition using the offset frequency.

In some embodiments, the method may further include identifying a second dataset using an intra-repetition frequency hopping PUSCH transmission scheme; determining that the second dataset includes segmented symbols; disabling the intra-repetition frequency hopping; and transmitting the second dataset using the transmission frequency indicated by the frequency domain resource allocation.

In some embodiments, the method may further include identifying a second dataset having a first portion of symbols and a second portion of symbols using an inter-slot frequency hopping PUSCH transmission scheme and determining that the first portion and the second portion are segmented. The method may further include transmitting the first portion in a first transmission slot using the transmission frequency and transmitting the second portion in a second transmission slot using the offset frequency.

In some embodiments, the method may further include identifying a second dataset having a first portion of symbols and a second portion of symbols using an inter-slot frequency hopping PUSCH transmission scheme; determining that the first portion and the second portion are non-segmented; transmitting the first portion in a first transmission slot using the transmission frequency; and transmitting the second portion in a second transmission slot using the offset frequency.

In some embodiments, the transmitting using the offset frequency may further include modifying the transmission frequency by translating the transmission frequency using the offset frequency.

In some embodiments, the method may further include the frequency domain resource allocation indicating a first range of frequencies corresponding to the transmission frequency and a second range of frequencies corresponding to the offset frequency.

In some embodiments, the method may further include alternating between the transmission frequency and the offset frequency to transmit additional PUSCH data.

In some embodiments, a wireless communication system may facilitate frequency hopping for a PUSCH transmissions. The wireless communication system may comprise a transceiver and at least one processor coupled to the transceiver. The at least one processor may be configured to receive a frequency domain resource allocation indicating a transmission frequency and an offset frequency. The at least one processor may identify a dataset having symbols using a Physical Uplink Shared Channel (PUSCH) transmission scheme and identify that the PUSCH transmission scheme indicates usage of inter-repetition frequency hopping. In response to the determining, the at least one processor may divide the symbols into a first divided portion and a second divided portion for inter-repetition frequency hopping. The at least one processor may transmit, via the transceiver, the first divided portion of symbols in a first transmission repetition using the transmission frequency and transmit, via the transceiver, the second divided portion of symbols in a second transmission repetition using the offset frequency.

In some embodiments, the symbols may be segmented.

In some embodiments, the symbols may be non-segmented.

In some embodiments, the at least one processor may be further configured to identify a second dataset using an intra-repetition frequency hopping PUSCH transmission scheme and determine that the second dataset includes non-segmented symbols. In response to the determining, the at least one processor may divide symbols of the second dataset into a first divided portion and a second divided portion for intra-repetition frequency hopping. The at least one processor may be further configured to transmit the first divided portion in a third transmission repetition using the transmission frequency and transmit the second divided portion of symbols in the third transmission repetition using the offset frequency.

In some embodiments, the at least one processor may be further configured to identify a second dataset using an intra-repetition frequency hopping PUSCH transmission scheme. The at least one processor may be configured to determine that the second dataset includes segmented symbols and disable the intra-repetition frequency hopping. The at least one processor may further be configured to transmit the second dataset using the transmission frequency indicated by the frequency domain resource allocation.

In some embodiments, the frequency domain resource allocation indicates a first range of frequencies corresponding to the transmission frequency and a second range of frequencies corresponding to the offset frequency.

In some embodiments, the at least one processor may be further configured to alternate between the transmission frequency and the offset frequency to transmit additional PUSCH data.

In some embodiments, a method for facilitating frequency hopping for PUSCH transmissions may include receiving a frequency domain resource allocation indicating a transmission frequency and an offset frequency. The method may further include identifying a dataset having symbols using a Physical Uplink Shared Channel (PUSCH) transmission scheme and identifying that the PUSCH transmission scheme indicates usage of frequency hopping. In response to the determining, the method may further include dividing the symbols into a first divided portion and a second divided portion for frequency hopping. The method may further include transmitting the first divided portion using the transmission frequency and transmitting the second divided portion of symbols using the offset frequency.

In some embodiments, the frequency hopping is an intra-repetition frequency hopping PUSCH transmission scheme and the method may further include determining that a length of the symbols meets a symbol length threshold. The method may further include transmitting the first divided portion of symbols in a transmission repetition using the transmission frequency and transmitting the second divided portion of symbols in the transmission repetition using the offset frequency.

In some embodiments, the method may further include and receiving a second dataset and determining that symbols of the second dataset are segmented. The method may further include disabling the intra-repetition frequency hopping PUSCH transmission scheme and transmitting the second dataset using the transmission frequency indicated by the frequency domain resource allocation.

In some embodiments, the frequency hopping is an inter-repetition frequency hopping PUSCH transmission scheme and the method may further include transmitting the first divided portion of symbols in a first transmission repetition using the transmission frequency and transmitting the second divided portion of symbols in a second transmission repetition using the offset frequency.

In some embodiments, the frequency domain resource allocation indicates a first range of frequencies corresponding to the transmission frequency and a second range of frequencies corresponding to the offset frequency In some embodiments, the method may further include alternating between the transmission frequency and the offset frequency to transmit additional PUSCH data.

BRIEF DESCRIPTION OF THE DRAWINGS/FIGURES

Figure 1:
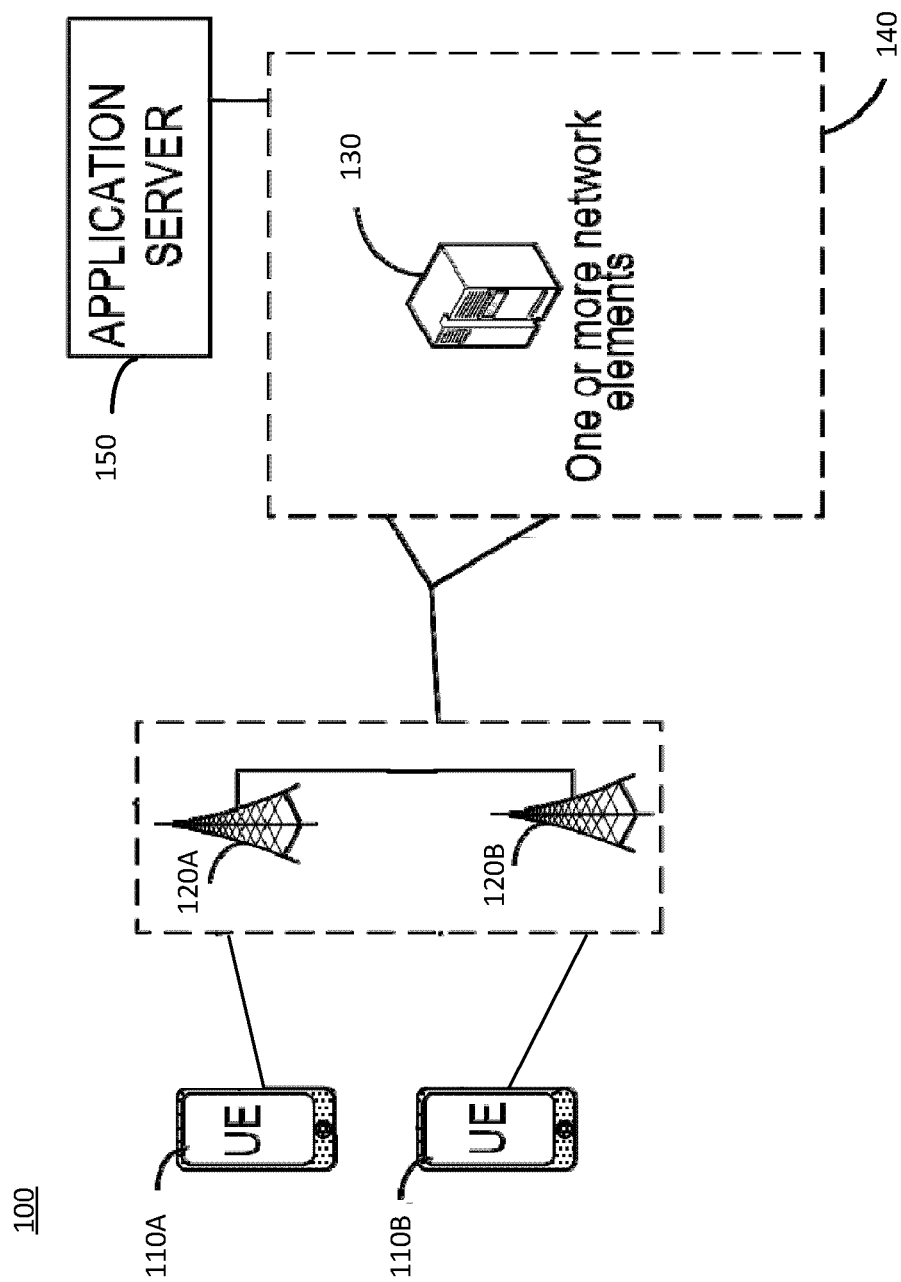
FIG. 1 illustrates an example system implementing frequency hopping for physical uplink shared channel (PUSCH) communications, according to some embodiments.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

This disclosure relates to user equipment (UE) communications using the 5G wireless communications protocol. As part of the development of the 5G standard, 3rd Generation Partnership Project (3GPP) has released several documents detailing the meetings notes and developments. Two such documents are known as Release 15 (Rel-15) and Release 16 (Rel-16).

With Rel-15 and Rel-16, physical uplink shared channel (PUSCH) transmissions are supported for 5G communications from a UE to a node or base station. For example, the nodes may be gNB or ng-eNB nodes. The UE may use the PUSCH as a communication channel for transmitting data, information, and/or control information. While the UE may use the PUSCH, several issues related to interference may continue to impede successful communications. For example, channel fading and/or interference may cause issues related to particular communication frequencies.

One strategy for countering these interference issues is the use of frequency hopping. Frequency hopping divides data into different segments that are transmitted at different frequencies. In this manner, if interference degrades communications on a particular frequency, the frequency hopping may still provide data using a different frequency. Frequency hopping may provide channel diversity to combat interference.

Using frequency hopping, however, may introduce other issues which may not be desirable. For example, frequency hopping may result in resource fragmentation when communication symbols are segmented. This fragmentation may create difficulty reconstructing a message when received. Further, frequency hopping may be sensitive to dynamic events, which may limit flexible downlink and/or uplink adjustments. In this manner, introducing frequency hopping for PUSCH communications may require a balance of different factors to provide a frequency hopping functionality without disrupting other elements of 5G communications.

This disclosure describes a process for PUSCH transmissions that introduces inter-slot frequency hopping, inter-repetition frequency hopping, and intra-repetition frequency hopping. This process may aid legacy UEs and/or modern UEs in providing PUSCH communications while employing frequency hopping. Further, the embodiments described herein may limit the fragmentation of resources to provide more reliable communications and may allow sharing the time-frequency resources among different UEs. Some UEs may use Rel-15 PUSCH frequency hopping schemes while other UEs may use Rel-16 PUSCH frequency hopping schemes.

As will be further explained below, a UE may receive a frequency domain resource allocation from a network node. For example, the frequency domain resource allocation may indicate a particular group of frequencies around a starting frequency as well as a second group of frequencies around an offset frequency, where frequency/frequencies is/are associated with physical resource blocks (PRB/PRBs). The starting or transmission frequency and the offset frequency may be used for frequency hopping. In some embodiments, the UE may support inter-slot frequency hopping, inter-repetition frequency hopping, or intra-repetition frequency hopping. In some embodiments, an index to the frequency hopping offset may be indicated in Downlink Control Information (DCI) format 0_2/0_1/0_0.

Based on the configuration of the data, setting of the UE, and/or a command received from a communication node, the UE may be configured to transmit a dataset comprising data symbols using a physical uplink shared channel (PUSCH) transmission scheme. The UE may then determine whether the transmission is performed with inter-slot frequency hopping, inter-repetition frequency hopping, or intra-repetition frequency hopping. From a communication node, the UE may receive one or more signalling to determine whether frequency hopping is applied to a PUSCH. When frequency hopping is applied, the one or more signalling may indicate which frequency hopping scheme among inter-slot frequency hopping, inter-repetition frequency hopping, or intra-repetition frequency hopping is utilized. In NR Rel-16, a so-called PUSCH repetition type B is introduced. The time domain resource of a PUSCH repetition type B is characterized by a triplet (S, L, K). The time domain resource is comprised of K PUSCH nominal repetitions; each PUSCH nominal repetition is comprised of L OFDM symbols; and S is the starting symbol index in a slot where the first symbol in the first PUSCH nominal repetition appears. A PUSCH nominal repetition can be segmented into one or multiple actual repetitions due to the nominal repetition being contained in two slots in part, and/or one or more symbol within the nominal repetition is not available for this PUSCH repetition type B transmission, and there are fewer than L symbols in a resulted actual repetition. In some cases, there may be a single actual repetition resulted from a nominal repetition, and the number of symbols in the actual repetition is less than L. If all symbols under a nominal repetition are available for this PUSCH repetition type B transmission, and the nominal repetition is completely contained in one slot, then the nominal repetition results in one actual repetition with L symbols. Inter-slot frequency hopping, inter-repetition frequency hopping, or intra-repetition frequency hopping maps actual repetitions from nominal repetitions to one or more frequency locations. For inter-slot frequency hopping and inter-repetition frequency hopping, the frequency location is the same for the symbols in an actual repetition; for intra-repetition frequency hopping, within some actual repetition, the frequency location of some symbols may be different from that of some others.

In some embodiments, with inter-slot frequency hopping, all symbols in an actual repetition start from the same frequency location, and further all symbols in all actual repetitions within the same slot start from the same frequency location. In some embodiments, all actual repetitions within the same slot start from the same frequency location.

In some embodiments, with inter-repetition frequency hopping, all symbols in an actual repetition start from the same frequency location. Further, all symbols in all actual repetitions within the same nominal repetition start from the same frequency location.

In some embodiments with intra-repetition frequency hopping, when a nominal repetition is mapped into one or multiple actual repetitions, the number of symbols in an actual repetition is compared with a threshold X, if the number of symbols in the actual repetition is no less than X, then the actual repetition is divided into two portions, with floor (X/2) symbols in the first portion, and ceil (X/2) symbols in the second portion. The first portion starts from the starting RB, and the second portion starts from the starting RB modified by an offset. If the number of symbols in the actual repetition is less than X, then all the symbols of the actual repetition start from the same frequency location, which can be either the starting RB or the starting RB modified by an offset. The threshold X may depend on L. In some embodiments, X may be the same as L.

In some embodiments, with intra-repetition frequency hopping, when a nominal repetition is mapped into one or multiple actual repetitions, the number of symbols in an actual repetition is compared with a threshold X, if the number of symbols in the actual repetition is not less than X, then the actual repetition is divided into two portions, with floor (X/2) symbols in the first portion, and ceil (X/2) symbols in the second portion. The first portion starts from the starting RB, and the second portion starts from the starting RB modified by an offset. In some embodiments, when the number of symbols in an actual repetition is less than X, or one nominal repetition results in two or more actual repetitions, all the symbols in an actual repetition start from the same frequency location. To determine the frequency location where all the symbols in an actual repetition start, denote the symbols with indices $\{1, 2, \ldots, L\}$ for symbols in a nominal repetition. The indices are divided into two sets, for example $\{1, \ldots, \text{floor}(L/2)\}$ and $\{\text{floor}(L/2)+1, \ldots, L\}$. If an actual repetition contains a symbol with a symbol index belonging to the first set, then all the symbols in the actual repetition start from one frequency location (e.g. the starting RB). If an actual repetition has no symbol with an index belonging to the first set, then the actual repetition starts from another frequency location (e.g the starting RB modified by an offset). Alternatively, the test can be performed with the second set. If an actual repetition contains a symbol with symbol index belonging to the second set, then all the symbols in the actual repetition starts from one frequency location (e.g. the starting RB modified by an offset). If an actual repetition has no symbol with an index belonging to the second set, then the actual repetition starts from another frequency location (.e.g the starting RB).

The triplet and other transmission parameters of a PUSCH repetition type B can be provided in one or more signalling from the gNB, including RRC signalling from the network, dynamic signalling provided from a DCI. In some embodiments, the UE may be a legacy device which may be updated to communicate using the Rel-16 protocol. In this case, the embodiments described herein may be used to configure the communications to be compliant with the Rel-16 and/or other 5G protocols.

For inter-slot and/or inter-repetition frequency hopping, the UE may transmit PUSCH transmissions for a first portion of symbols within a first slot using the starting RB transmission frequency. This transmission may occur when repetitions are identified and/or if symbols are segmented. That is, if a PUSCH nominal repetition of symbols is segmented, the actual repetitions in the first slot may be transmitted using the starting RB transmission frequency. Under this inter-slot and/or inter-repetition frequency hopping scheme, the actual repetitions in a second slot using the transmission frequency as modified by the offset frequency. For example, the offset frequency may indicate a particular difference from the starting RB transmission frequency. Actual repetitions contained in the same slot are transmitted from the same frequency location, for example from the starting RB transmission frequency or from the starting RB transmission frequency modified by the offset frequency. This formatting may be repeated for additional symbols of the dataset as the transmission hops between the starting transmission frequency and the offset frequency to provide inter-slot and/or inter-repetition frequency hopping for the PUSCH transmissions.

For intra-repetition frequency hopping, symbols that are not segmented within a slot may be transmitted by dividing the symbols into different divided portions. A first divided portion may be transmitted using a first starting RB transmission frequency while a second divided portion may be transmitted using a second offset frequency. This division may occur within a slot and/or provide intra-repetition frequency hopping.

If a group of symbols is determined to be segmented for an intra-repetition frequency hopping scheme, the UE may disable the intra-repetition frequency hopping for that PUSCH repetition. In this case, the UE may transmit the segmented symbols using the starting RB transmission frequency. In this manner, disabling the intra-repetition frequency hopping may aid in reducing resource fragmentation. The UE may still employ frequency hopping for other slots and/or repetitions to provide channel diversity. In this manner, the embodiments described herein may balance the different considerations for providing frequency hopping for PUSCH transmissions.

Various embodiments of these features will now be discussed with respect to the corresponding figures.

FIG. 1 illustrates an example system 100 implementing frequency hopping for physical uplink shared channel (PUSCH) communications, according to some embodiments. FIG. 1 illustrates an example system architecture 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 110A and UE 110B (collectively referred to as "UEs 110" or "UE 101"). In this example, UEs 110 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

The UEs 110 may be configured to connect, for example, communicatively coupled, with a Radio Access Network (RAN) including RAN nodes 120A, 120B. In embodiments, the RAN may be an NG RAN or a 5G RAN, an E-UTRAN, or a legacy RAN, such as a UTRAN or GERAN. As used herein, the term "NG RAN" or the like may refer to a RAN that operates in an NR or 5G system 100, and the term "E-UTRAN" or the like may refer to a RAN that operates in an LTE or 4G system 100. The UEs 110 utilize connections (or channels), respectively, each of which comprises a physical communications interface or layer (discussed in further detail below).

In this example, the connections are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 110 may directly exchange communication data via a ProSe interface. The ProSe interface may alternatively be referred to as a SL interface 105 and may comprise one or more logical channels, including but not limited to a PSCCH, a PSSCH, a PSDCH, and a PSBCH.

The UE 110B may be configured to access an access point (AP) (also referred to as "WLAN node," "WLAN," "WLAN Termination," "WT" or the like). The connection can comprise a local wireless connection, such as a connection consistent with any IEEE 802.11 protocol, wherein the AP would comprise a wireless fidelity (Wi-Fi®) router. In this example, the AP is shown to be connected to the Internet without connecting to the core network of the wireless system (described in further detail below). In various embodiments, the UE 110B, RAN, and AP may be configured to utilize LWA operation and/or LWIP operation. The LWA operation may involve the UE 110B in RRC_CONNECTED being configured by a RAN node 120A, 120B to utilize radio resources of LTE and WLAN. LWIP operation may involve the UE 110B using WLAN radio resources via IPsec protocol tunneling to authenticate and encrypt packets (e.g., IP packets) sent over the connection. IPsec tunneling may include encapsulating the entirety of original IP packets and adding a new packet header, thereby protecting the original header of the IP packets.

The RAN can include one or more AN nodes or RAN nodes 120A and 120B (collectively referred to as "RAN nodes 120" or "RAN node 120"). As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 120 that operates in an NR or 5G system 100 (for example, a gNB), and the term "E-UTRAN node" or the like may refer to a RAN node 120 that operates in an LTE or 4G system 100 (e.g., an eNB). According to various embodiments, the RAN nodes 120 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 120 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 120; a MAC/PHY split wherein RRC, PDCP, RLC, and MAC layers are operated by the CRAN/vBBUP and the PHY layer is operated by individual RAN nodes 120; or a "lower PHY" split wherein RRC, PDCP, RLC, MAC layers and upper portions of the PHY layer are operated by the CRAN/vBBUP and lower portions of the PHY layer are operated by individual RAN nodes 120. This virtualized framework allows the freed-up processor cores of the RAN nodes 120 to perform other virtualized applications. In some implementations, an individual RAN node 120 may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the RAN (not shown) or by a server pool in a similar manner as the CRAN/vBBUP. Additionally or alternatively, one or more of the RAN nodes 120 may be next generation eNBs (ng-eNBs), which are RAN nodes that provide E-UTRA user plane and control plane protocol terminations toward the UEs 110, and are connected to a 5GC via an NG interface (discussed infra).

In V2X scenarios one or more of the RAN nodes 120 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 110 (vUEs 110). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 120 can terminate the air interface protocol and can be the first point of contact for the UEs 110. In some embodiments, any of the RAN nodes 120 can fulfill various logical functions for the RAN including, but not limited to, radio network controller (RNC) functions such as radio bearer management, uplink and downlink dynamic radio resource management and data packet scheduling, and mobility management.

In embodiments, the UEs 110 can be configured to communicate using OFDM communication signals with each other or with any of the RAN nodes 120 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 120 to the UEs 110, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 110 and the RAN nodes 120 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 110 and the RAN nodes 120 may operate using LAA, eLAA, and/or feLAA mechanisms. In these implementations, the UEs 110 and the RAN nodes 120 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 110, RAN nodes 120, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 110, AP, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 110. The PDCCH carries information about the transport format and resource allocations related to the PDSCH channel, among other things. It may also inform the UEs 110 about the transport format, resource allocation, and HARQ information related to the uplink shared channel. Typically, downlink scheduling (assigning control and shared channel resource blocks to the UE 110B within a cell) may be performed at any of the RAN nodes 120 based on channel quality information fed back from any of the UEs 110. The downlink resource assignment information may be sent on the PDCCH used for (e.g., assigned to) each of the UEs 110.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 120 may be configured to communicate with one another via an interface. In embodiments where the system 100 is an LTE system (e.g., when core network (CN) 140 is an EPC), the interface may be an X2 interface. The X2 interface may be defined between two or more RAN nodes 120 (e.g., two or more eNBs and the like) that connect to EPC, and/or between two eNBs connecting to EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 110 from an SeNB for user data; information of PDCP PDUs that were not delivered to a UE 110; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system (e.g., when CN 140 is an 5GC), the interface may be an Xn interface. The Xn interface is defined between two or more RAN nodes 120 (e.g., two or more gNBs and the like) that connect to 5GC, between a RAN node 120 (e.g., a gNB) connecting to 5GC and an eNB, and/or between two eNBs connecting to 5GC. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 110 in a connected mode (e.g., CM-CONNECTED) including functionality to manage the UE mobility for connected mode between one or more RAN nodes 120. The mobility support may include context transfer from an old (source) serving RAN node 120 to new (target) serving RAN node 120; and control of user plane tunnels between old (source) serving RAN node 120 to new (target) serving RAN node 120. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN is shown to be communicatively coupled to a core network—in this embodiment, core network (CN) 140. The CN 140 may comprise a plurality of network elements 130, which are configured to offer various data and telecommunications services to customers/subscribers (e.g., users of UEs 110) who are connected to the CN 140 via the RAN. The components of the CN 140 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 140 may be referred to as a network slice, and a logical instantiation of a portion of the CN 140 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 150 may be an element offering applications that use IP bearer resources with the core network (e.g., UMTS PS domain, LTE PS data services, etc.). The application server 150 can also be configured to support one or more communication services (e.g., VoIP sessions, PTT sessions, group communication sessions, social networking services, etc.) for the UEs 110 via the CN 140.

In embodiments, the CN 140 may be a 5GC, and the RAN may be connected with the CN 140 via an NG interface. In embodiments, the NG interface may be split into two parts, an NG user plane (NG-U) interface, which carries traffic data between the RAN nodes 120 and a UPF, and the S1 control plane (NG-C) interface, which is a signaling interface between the RAN nodes 120 and AMFs.

Figure 2:
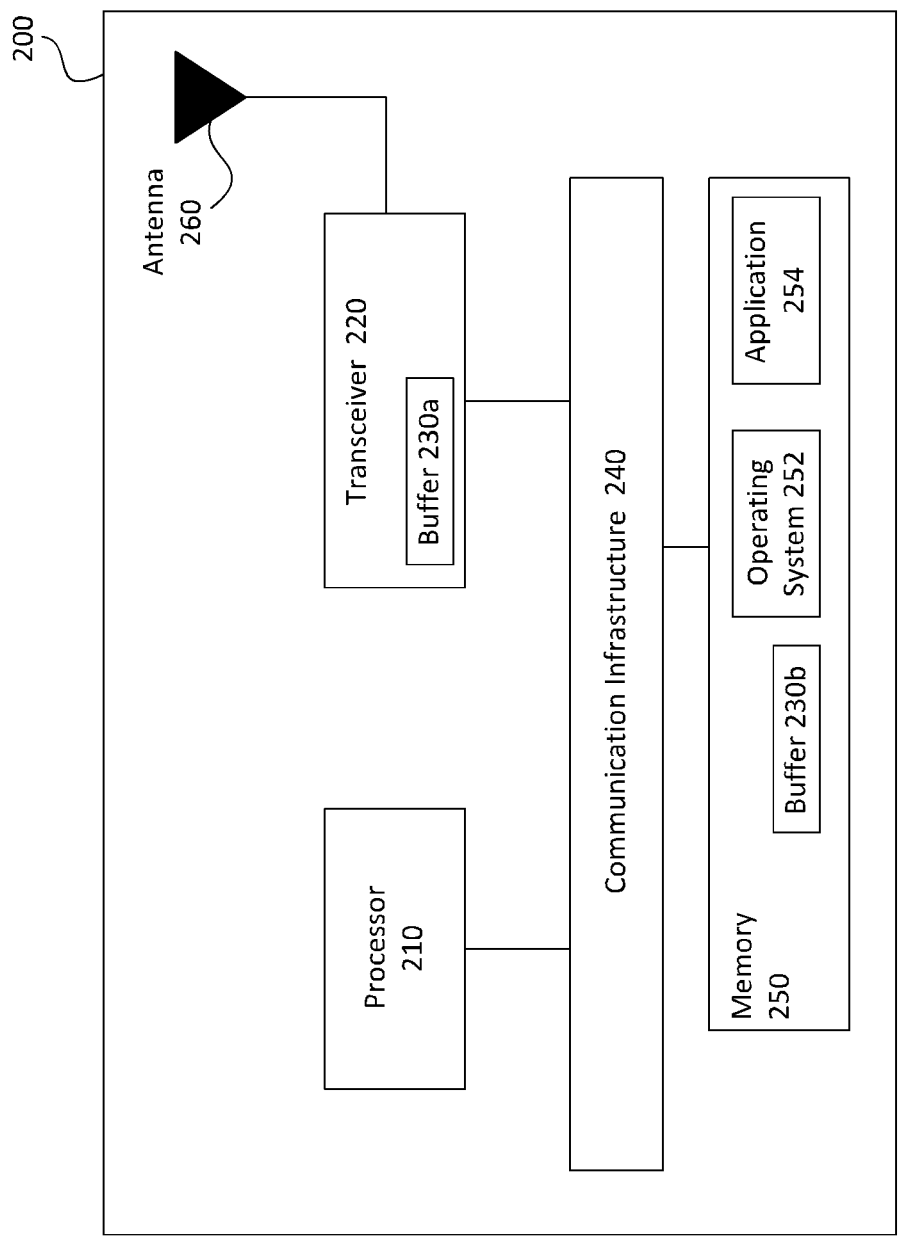
FIG. 2 illustrates a block diagram of an example wireless system of an electronic device implementing frequency hopping for PUSCH communications, according to some embodiments of the disclosure.

FIG. 2 illustrates a block diagram of an example wireless system 200 of an electronic device implementing the frequency hopping for PUSCH communications, according to some embodiments of the disclosure. System 200 may be any of the UE 110 electronic devices of system 100. System 200 includes processor 210, transceiver 220, buffer(s) 230*a* and 230*b*, communication infrastructure 240, memory 250, operating system 252, application 254, and antenna 260. Illustrated systems are provided as exemplary parts of wireless system 200, and system 200 can include other circuit(s) and subsystem(s). Also, although the systems of wireless system 200 are illustrated as separate components, the embodiments of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or transceiver 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

Alternatively or in addition to the operating system, system 200 can include communication infrastructure 240. Communication infrastructure 240 provides communication between, for example, processor 210, transceiver 220, and memory 250. In some implementations, communication infrastructure 240 may be a bus. Processor 210 together with instructions stored in memory 250 perform operations enabling wireless system 200 of system 100 to implement the frequency hopping for PUSCH communications as described herein. Additionally or alternatively, transceiver 220 performs operations enabling wireless system 200 as UE 110 of system 100 to implement the frequency hopping for PUSCH communications as described herein.

Transceiver 220 transmits and receives communications signals that support the frequency hopping for PUSCH communications, according to some embodiments, and may be coupled to antenna 260. Antenna 260 may include one or more antennas that may be the same or different types. Transceiver 220 allows system 200 to communicate with other devices that may be wired and/or wireless. Transceiver 220 can include processors, controllers, radios, sockets, plugs, buffers, and like circuits/devices used for connecting to and communication on networks. According to some examples, transceiver 220 includes one or more circuits to connect to and communicate on wired and/or wireless networks. Transceiver 220 can include a cellular subsystem, a WLAN subsystem, and/or a Bluetooth™ subsystem, each including its own radio transceiver and protocol(s) as will be understood by those skilled arts based on the discussion provided herein. In some implementations, transceiver 220 can include more or fewer systems for communicating with other devices.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem (not shown) can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to, networks based on standards described in IEEE 802.11 (such as, but not limited to, IEEE 802.11ac, IEEE 802.11ax, IEEE 802.11bc, IEEE 802.11bd, IEEE 802.11be, etc.).

According to some embodiments, processor 210, alone or in combination with memory 250, and/or transceiver 220, implements the frequency hopping for PUSCH communications. For example, system 200 is configured to generate and transmit frequency hopping for PUSCH communications associated with a buffer (e.g., buffer 230a and/or buffer 230b) of transceiver 220.

According to some examples, processor 210, alone or in combination with transceiver 220 and/or memory 205 can receive rules and/or parameters associated with frequency hopping for PUSCH communications from, for example, RAN node 120. For example, RAN node 120 may transmit control information related to frequency domain resource allocations and/or resource block (RB) allocations. In some embodiments, RAN node 120 may indicate the type of frequency hopping to be performed, such as, for example, inter-slot, inter-repetition, or intra-repetition frequency hopping. Processor 210, alone or in combination with transceiver 220 and/or memory 205, can determine, generate, and transmit the PUSCH communications using frequency hopping based on the received rules and/or parameters.

Also, processor 210, alone or in combination with transceiver 220 and/or memory 205, can receive UL MU transmission schedule from, for example, RAN node 120 and transmit the buffered data based on the received UL MU transmission schedule.

Figure 3A:
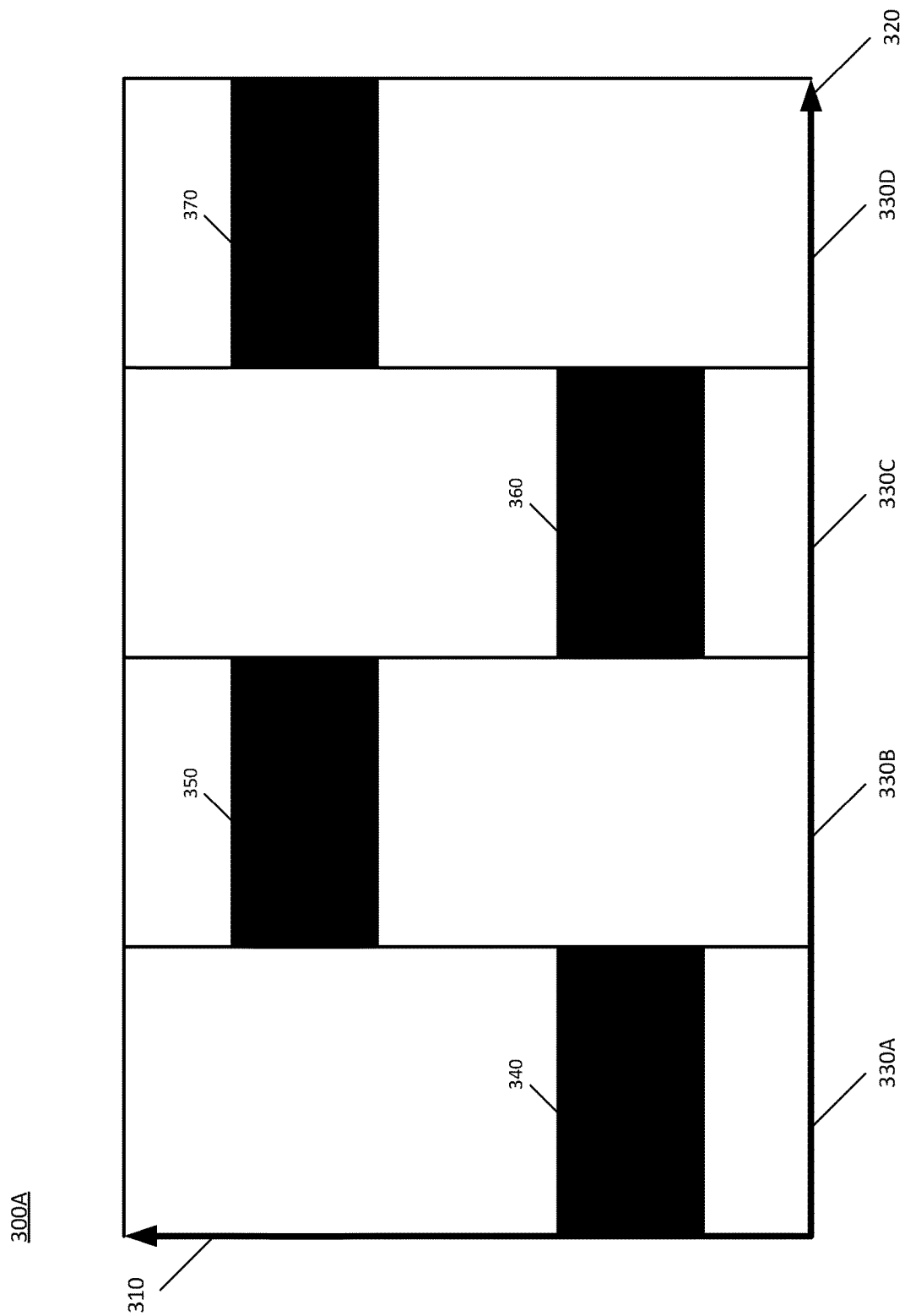
FIG. 3A illustrates a block diagram of inter-slot frequency hopping according to some embodiments.

FIG. 3A illustrates a block diagram 300A of inter-slot frequency hopping according to some embodiments. Block diagram 300A may illustrate data transmissions from a UE 110 as illustrated in FIG. 1 and/or wireless system 200. This inter-slot frequency hopping may correspond to Rel-15 frequency hopping. In some embodiments, block diagram 300A may be a timing diagram. UE 110 may transmit physical uplink shared channel (PUSCH) data using the inter-slot frequency hopping scheme depicted in block diagram 300A.

Block diagram 300A may include two axes. Axis 310 may indicate a frequency scale while axis 320 may indicate a time scale. Block diagram 300A may depict a communication frame and/or may be divided into different slots 330. In some embodiments, the slots 330 may be subframes of a frame. A UE 110 may transmit communication data by transmitting data in the slots 330. For example, the UE may transmit PUSCH data and/or transmit the data to a RAN node 120. While four slots 330 are depicted in FIG. 3A, more or fewer slots may be used for the transmission of PUSCH data.

For wireless communications, including 5G communications, the PUSCH data may be transmitted in a spread spectrum manner. For example, frequency domain resource allocations and/or resource block (RB) allocations may be designated for use by the UE 110 to transmit information. In some embodiments, a RAN node 120 may provide command information to the UE 110 indicate a resource block for the UE 110 to utilize when transmitting PUSCH data. The frequency domain resource allocation may designate a range of frequencies and/or a range of subcarrier frequencies for transmission. This range of frequencies may be centered on a particular transmission frequency.

To illustrate an example embodiment, block 340 may represent a transmission of data and/or symbols within slot 330A. The UE 110 may transmit block 340 using the range of frequencies indicated by the frequency domain resource allocation. This range of frequencies may be identified from the height of block 340 as depicted in block diagram 300A. The range of frequencies may be identified using axis 310, which indicates a frequency scale. As previously described, the frequency domain resource allocation may indicate a center frequency and/or a width indicating the range of frequencies to be used for PUSCH transmissions.

For the inter-slot frequency hopping, UE 110 may alternate the range of frequencies used to transmit data such as PUSCH transmissions. For example, in a first slot 330A, UE 110 may transmit block 340 using a first, central transmission frequency and/or a first range of frequencies. This range of frequencies may be indicated by the frequency domain resource allocation. For a second slot 330B, however, the UE 110 may "hop" frequencies and transmit block 350 using a second, offset transmission frequency and/or a second range of frequencies. The second slot 330B may be a different time instance and/or subframe than the first slot 330A. The second slot 330B may use an offset transmission frequency which may be an offset from the transmission frequency used in slot 330A. In some embodiments, the offset frequency may be applied to each subcarrier to translate the range of frequencies used for transmission.

Using the offset frequency may allow UE 110 to transmit data using different ranges of carrier frequencies. This transmission may provide channel diversity to combat deleterious effects from interference and/or channel fading.

UE 110 may continue to alternate the frequency range between these two ranges as UE 110 continues to communicate. For example, slot 330C may transmit block 360 using the first transmission frequency and/or first range of frequencies while slot 330D may transmit block 370 using the second offset frequency and/or second range of frequencies.

In some embodiments, different frequencies may be used. For example, multiple offset frequencies may be used to generate different transmission patterns. For inter-slot frequency hopping, however, the range of transmission frequencies may be consistent within a particular slot 330.

Figure 3B:
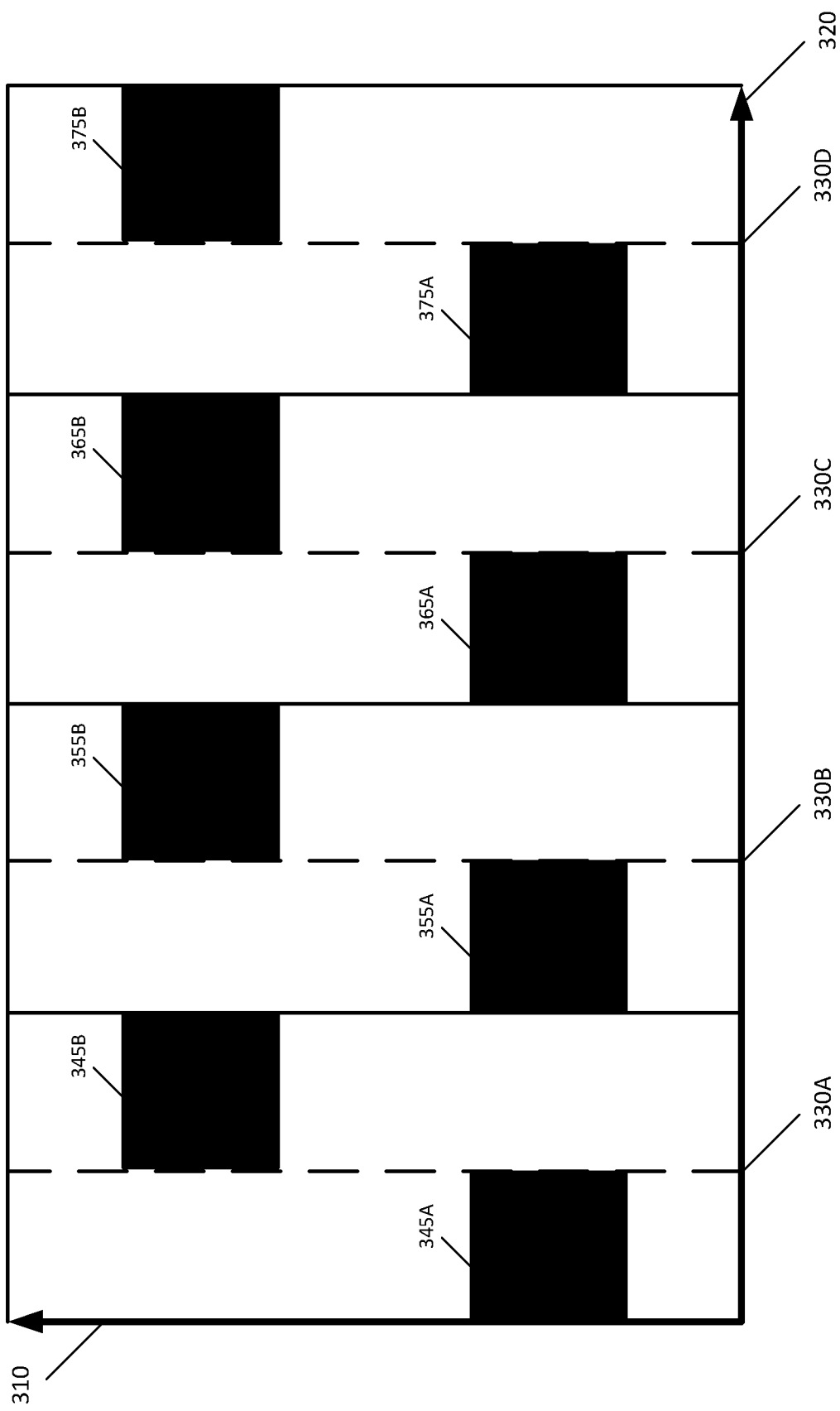
FIG. 3B illustrates a block diagram of intra-slot frequency hopping according to some embodiments.

FIG. 3B illustrates a block diagram 300B of intra-slot frequency hopping according to some embodiments. Block diagram 300B may illustrate data transmissions from a UE, such as UE 110 as illustrated in FIG. 1. This intra-slot frequency hopping may correspond to Rel-15 frequency hopping. In some embodiments, block diagram 300B may be a timing diagram. UE 110 may transmit physical uplink shared channel (PUSCH) data using the intra-slot frequency hopping scheme depicted in block diagram 300B.

Block diagram 300B may include two axes. Axis 310 may indicate a frequency scale while axis 320 may indicate a time scale. Block diagram 300 may depict a communication frame and/or may be divided into different slots 330. In some embodiments, the slots 330 may be subframes of a frame. A UE 110 may transmit communication data by transmitting data in the slots 330. For example, the UE may transmit PUSCH data and/or transmit the data to a RAN node 120. While four slots 330 are depicted in FIG. 3, more or fewer slots may be used for the transmission of PUSCH data.

Similar to inter-slot frequency hopping, for wireless communications, including 5G communications, the PUSCH data may be transmitted in a spread spectrum manner. For example, frequency domain resource allocations may be designated for use by the UE 110 to transmit information. A RAN node 120 may provide command information to the UE 110 indicate a resource block for the UE 110 to utilize when transmitting PUSCH data. The frequency domain resource allocation may designate a range of frequencies and/or a range of subcarrier frequencies for transmission. This range of frequencies may be centered on a particular transmission frequency.

Similar to inter-slot frequency hopping, intra-slot frequency hopping may achieve channel diversity by alternating a range of frequencies utilize to transmit data such as PUSCH transmissions. Intra-slot frequency hopping may differ from inter-slot frequency hopping by alternating the central frequency and/or range of frequencies within a particular slot 330.

To illustrate an example embodiment, in slot 330A, UE 110 may transmit data and/or symbols using blocks 345A and 345B. Within slot 330A, UE 110 may transmit block 345A using a first, central transmission frequency and/or a first range of frequencies. This range of frequencies may be indicated by a frequency domain resource allocation. UE 110 may transmit block 345B using a second, offset transmission frequency and/or a second range of frequencies. The transmission of block 345A and 345B may occur within slot 330A. In some embodiments, this type of intra-slot frequency hopping may divide a dataset, a portion of data, and/or a data symbols into divided portions to be transmitted using different frequency ranges within a particular slot 330. Using intra-slot frequency hopping may provide additional frequency changes for PUSCH transmissions.

Similarly for the other slots 330B, 300C, and 330D, the use of intra-slot frequency hopping may result in the division of symbols and transmission of data using different frequencies within a particular slot 330. For example, in slot 330B, block 355A may be transmitted using a first central transmission frequency and/or a first range of frequencies while block 355B may be transmitted using a second offset frequency and/or second range of frequencies. In some embodiments, these frequencies may be the same as the frequencies from slot 330A. In slot 330C, the UE may transmit blocks 365A and 365B, while in slot 330D, the UE may transmit blocks 375A and 375B.

Figure 4:
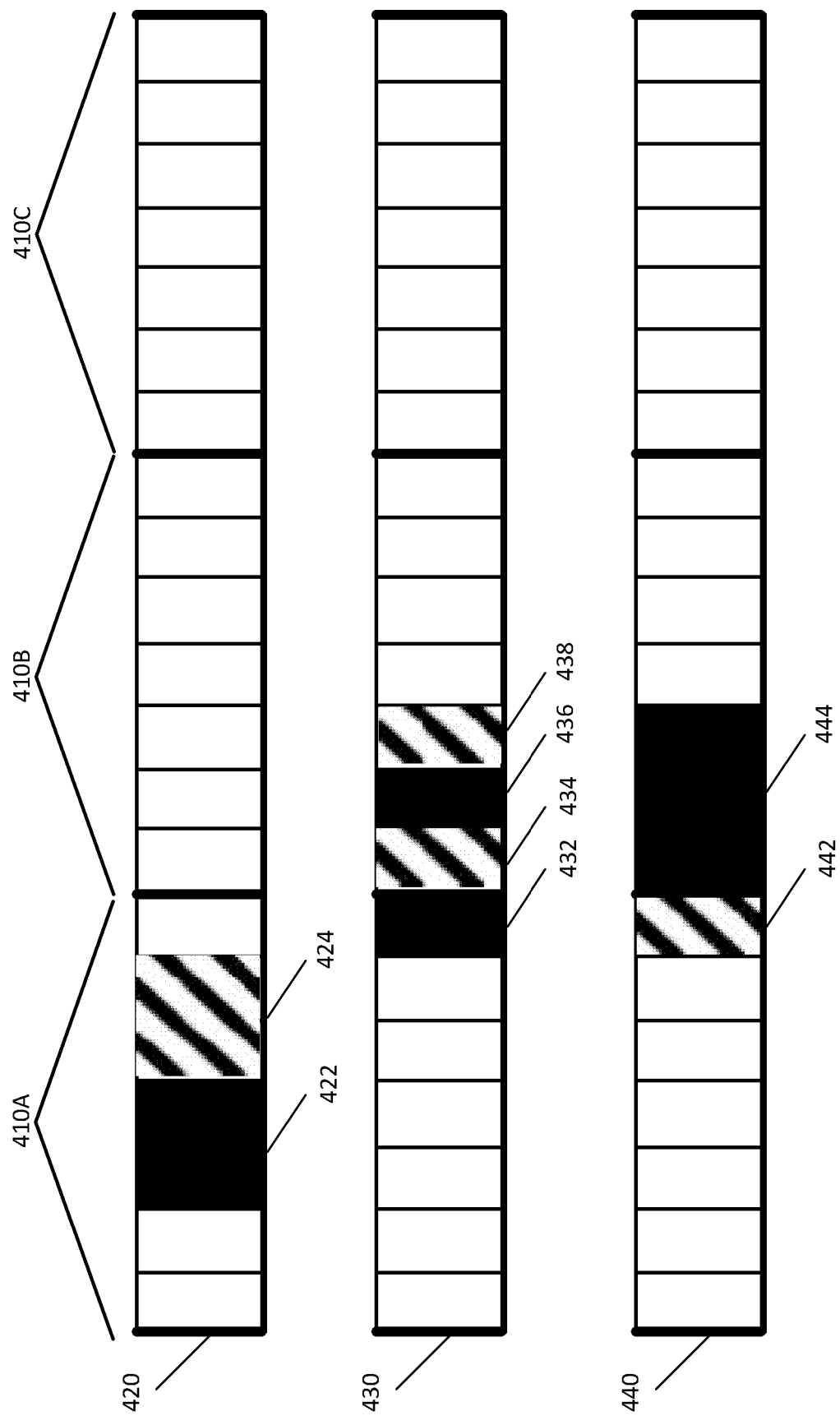
FIG. 4 illustrates a block diagram of PUSCH transmissions with segmentation according to some embodiments.

FIG. 4 illustrates a block diagram 400 of PUSCH transmissions with segmentation according to some embodiments. The segmentation depicted in block diagram 400 may illustrate segmentation due to symbols that may cross slot boundaries. In some embodiments, block diagram 400 may illustrate different PUSCH transmission patterns 420, 430, 440. These transmission patterns 420, 430, 440 may indicate time domain transmissions. In some embodiments, this PUSCH transmission structure may be used in Rel-16. Further, for each transmission pattern 420, 430, 440, different slots 410A, 410B, 410C may be used to transmit PUSCH data.

Transmission pattern 420 may illustrate a transmission of PUSCH data under a scenario without segmentation. In this case, a dataset of symbols may comprise symbols 422 and symbols 424. While symbols 422 and symbols 424 may differ, based on the timing of transmission, a UE may transmit the symbols within slot 410A. In this case, the UE may apply frequency hopping within slot 410A to distribute the symbols and achieve channel diversity.

In transmission patterns 430 and 440, however, groups of symbols may be segmented, which may cause symbols 432, 434, 436, 438, 442, and 444 to be divided between two slots 410A, 410B respectively. This division may introduce difficulty in performing frequency hopping because the segmented symbols may become fragmented if separated from adjacent symbols. For example, at a base station and/or node receiving the PUSCH transmission, the expectation may be to receive nominal repetitions of symbols, but a segmentation of timing may introduce fragmentation issues when applying frequency hopping. In this manner, the symbols cross slot boundaries may introduce segmentation which may complicate the frequency hopping process. Another example of this segmentation is illustrated in FIG. 5.

Figure 5:
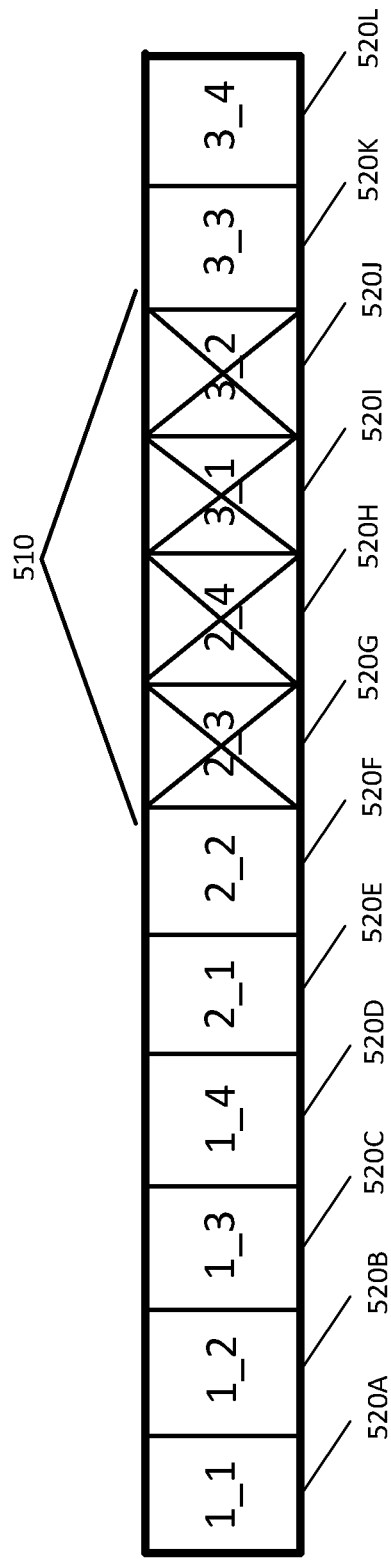
FIG. 5 illustrates a block diagram of symbol segmentation according to some embodiments.

FIG. 5 illustrates a block diagram 500 of symbol segmentation according to some embodiments. FIG. 5 may depict segmentation resulting from downlink transmissions that may occur during a PUSCH transmission. Block diagram 500 demonstrates this segmentation via a stream of symbols 520. The symbols may be a dataset to be transmitted by a UE using a PUSCH. In an example embodiment, a nominal repetition of symbols may be four symbols in length. For example, symbols 520A-520D designated as "1_1", "1_2", "1_3", and "1_4" may represent a nominal repetition. The nominal repetition may represent an agreed upon length of symbols exchanged between a UE and a node. In some embodiments, the nominal repetition may represent a symbol slot size, such as, for example, four symbols. The term "repetition" may refer to a transport block. The actual data of the symbols between repetitions may differ. In some embodiments, each symbol 520 may represent a length of two or more symbols. This embodiment will be further described below.

The segmentation of the dataset may occur due to a downlink transmission received by a UE during an attempt to transmit the stream of symbols 520. In some cases, the downlink may interrupt this transmission. For example, the downlink may occur when attempting to transmit symbols 520G-520J designated as "2_3", "2_4", "3_1", and "3_2". This set of symbols may be collectively referred to as segmented symbols 510. Downlink transmissions being received by the UE may occur during those times, which may prevent the UE from transmitting the segmented symbols 510.

In this case, even though the nominal length may be four symbols, for the second repetition, only two symbols 520E, 520F may be available for the UE to perform PUSCH transmissions. Similarly, for the third nominal repetition, only the two symbols 520K, 520L may be available.

In this manner, downlink transmissions may further introduce segmentation into PUSCH transmission schemes. When considering this segmentation as well as potential segmentation due to symbols potentially crossing slot boundaries, the use of frequency hopping becomes increasingly difficult in view of these complex scenarios. As will be further described below, however, several embodiments may be used to apply frequency hopping to PUSCH transmissions even in view of this segmentation.

Figure 6A:
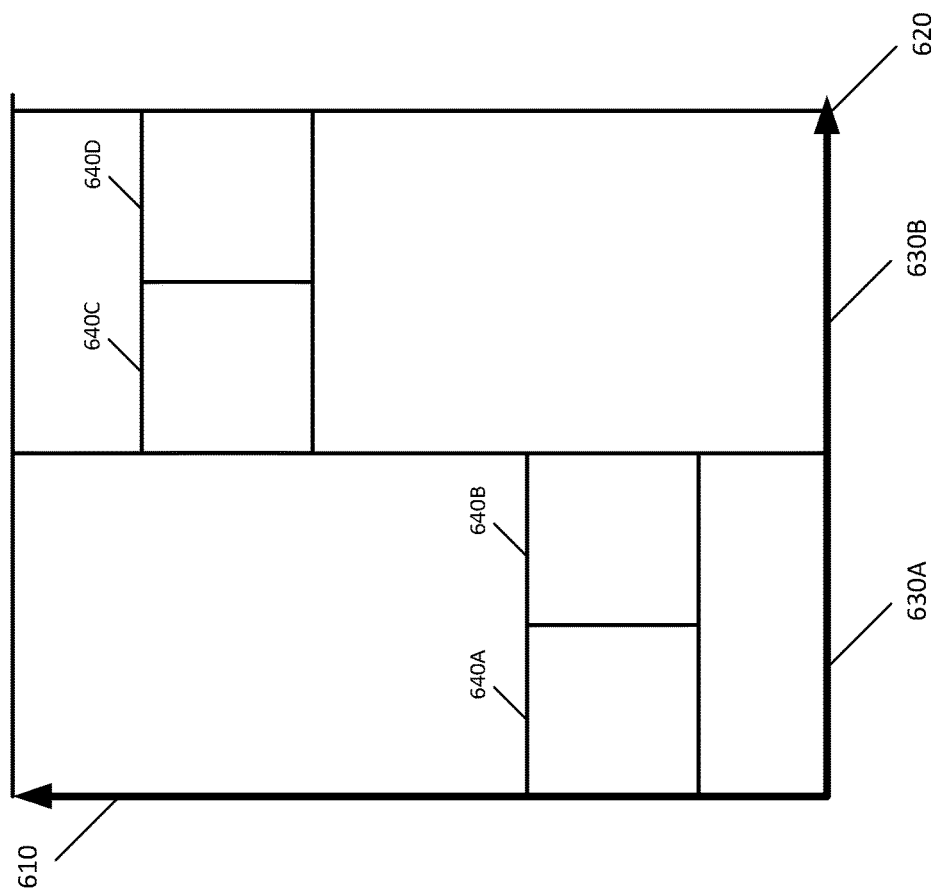
FIG. 6A illustrates a block diagram of inter-slot and/or inter-repetition frequency hopping for physical uplink shared channel (PUSCH) communications according to some embodiments.

FIG. 6A illustrates a block diagram 600A of inter-slot and/or inter-repetition frequency hopping for physical uplink shared channel (PUSCH) communications according to some embodiments. In some embodiments, block diagram 600A may depict a PUSCH transmission scheme when symbols are non-segmented. Block diagram 600A may be a timing diagram having two axes. Axis 610 may indicate a frequency scale while axis 620 may indicate a time scale. Block diagram 600A may depict a communication frame and/or may be divided into different slots 630. In some embodiments, the slots 630 may be subframes of a frame. A UE may transmit communication data by transmitting data in the slots 630. For example, the UE may transmit PUSCH data and/or transmit the data to a RAN node 120. While two slots 630 are depicted in FIG. 6, more or fewer slots may be used for the transmission of PUSCH data.

Similar to the previously described inter-slot frequency hopping configurations, the inter-slot frequency hopping depicted FIG. 6 may use different frequency ranges based on a frequency domain resource allocation to transmit PUSCH data. These frequency ranges may alternate between slots. For example, blocks 640A and 640B may be transmitted in slot 630A using a first, central transmission frequency and/or a first range of frequencies. This range of frequencies may be indicated by the frequency domain resource allocation. Blocks 640C and 640D may be transmitted in slot 630B using a second, offset frequency and/or a second range of frequencies. In some embodiments, as other blocks 640 are transmitted, the UE may alternate between these frequency ranges to transmit PUSCH data.

In block diagram 600A, blocks 640 may correspond to different symbols.

Without symbol segmentation within a slot 630, these symbols may be transported as blocks 640 with inter-slot frequency hopping. For example, if a slot 630 may transmit four symbols and each block 640 carries two symbols, slot 630A may transmit four symbols using the first central transmission frequency and/or first range of frequencies. Slot 630B may transmit four symbols using the second offset frequency and/or second range of frequencies. These eight symbols may be different dependent on the PUSCH data being transmitted.

Figure 6B:
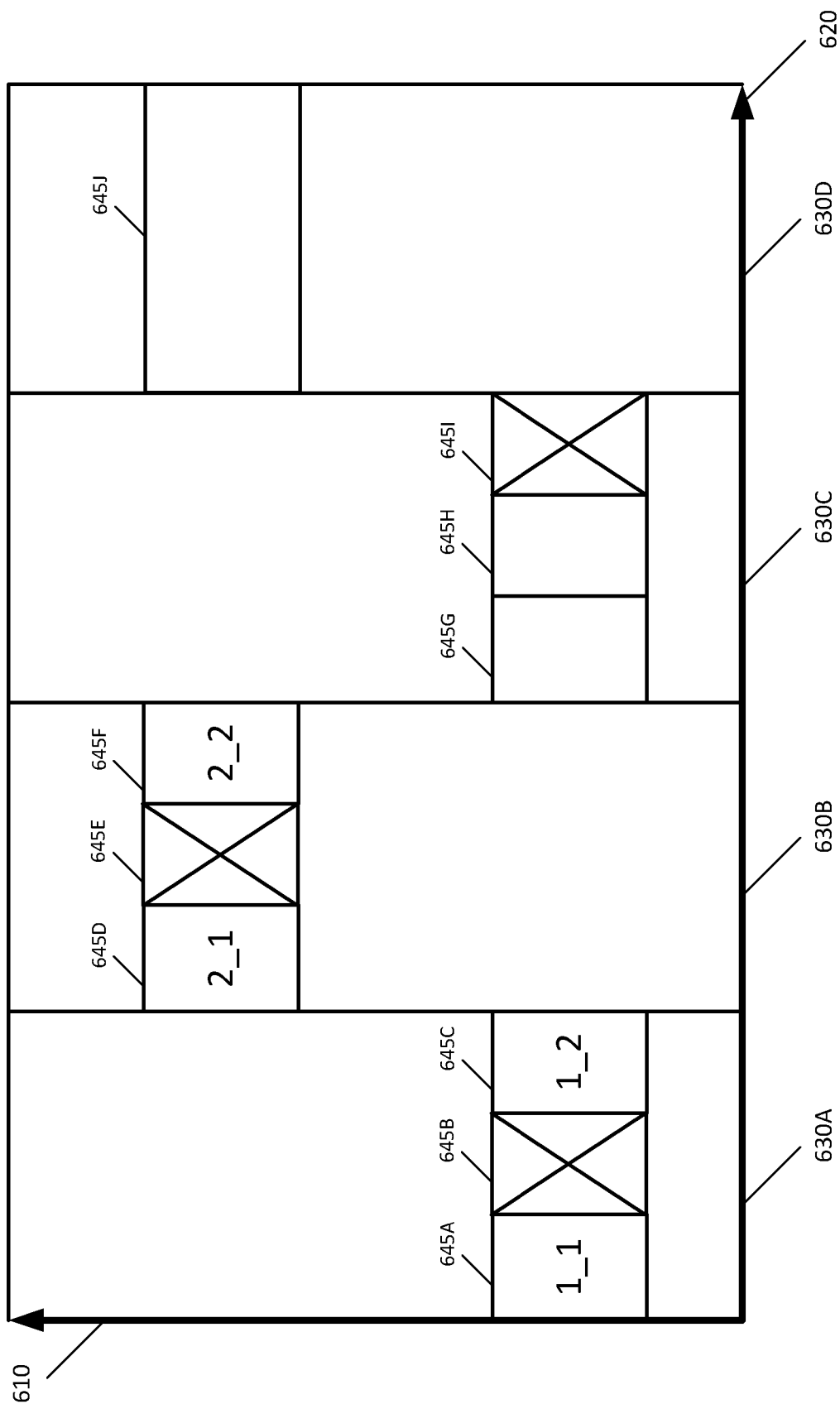
FIG. 6B illustrates a block diagram of inter-slot and/or inter-repetition frequency hopping for physical uplink shared channel (PUSCH) communications with segmentation according to some embodiments.

As previously described, the UE may transmit PUSCH data using this inter-slot frequency hopping when symbols may not be segmented. FIG. 6B as described below may provide a transmission scheme using inter-slot frequency hopping when symbols are segmented.

FIG. 6A may also depict inter-repetition frequency hopping. In this scheme, rather than slots 630A and 630B, under inter-repetition frequency hopping, symbols May be transmitted in repetitions 630A and 630B. These repetitions may represent a nominal repetition length as will be further described below. In this case, the repetitions 630A and 630B may be used to perform inter-repetition frequency hopping without using slots.

FIG. 6B illustrates a block diagram 600B of inter-slot and/or inter-repetition frequency hopping for physical uplink shared channel (PUSCH) communications with segmentation according to some embodiments. In some embodiments, block diagram 600B may depict a timing diagram for inter-slot frequency hopping for the segmentation depicted in FIG. 7.

Figure 7:
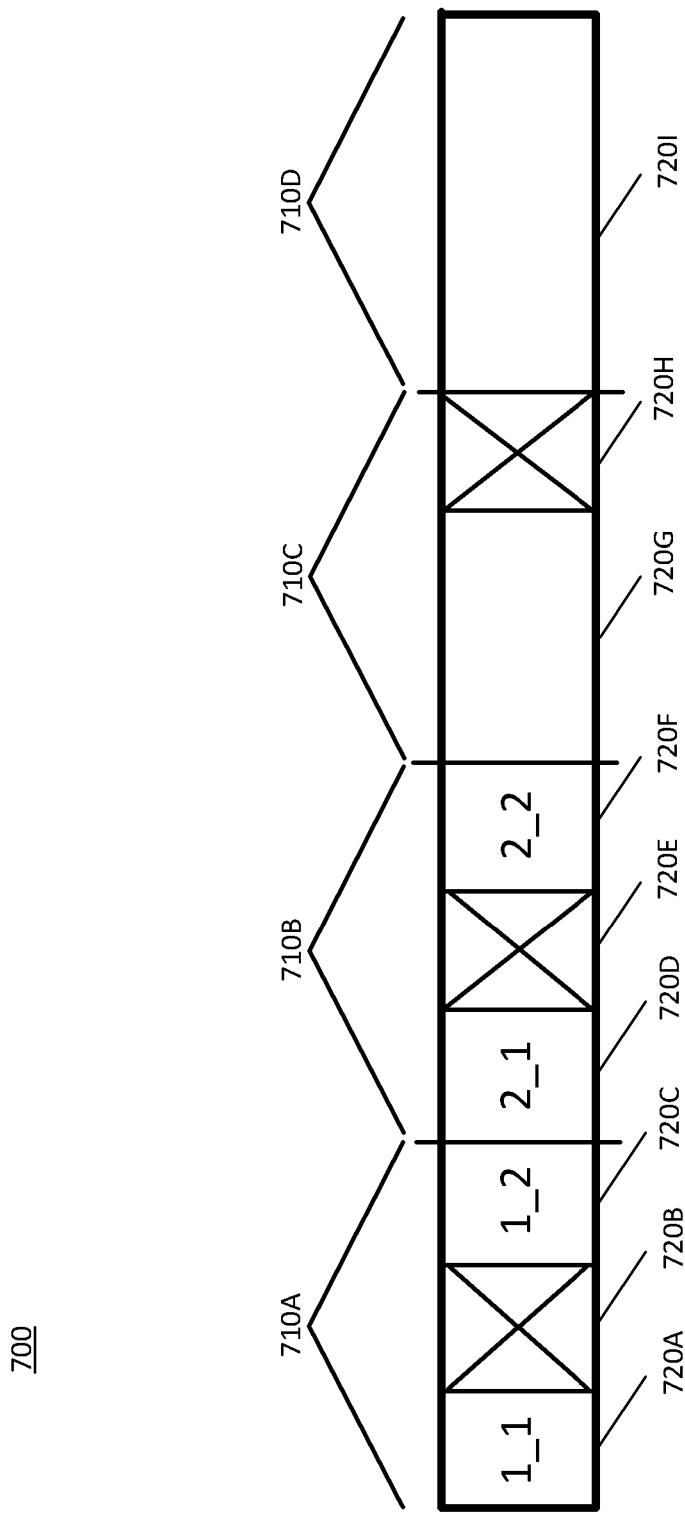
FIG. 7 illustrates a block diagram of a physical uplink shared channel (PUSCH) dataset with segmentation according to some embodiments.

FIG. 7 illustrates a block diagram of a physical uplink shared channel (PUSCH) dataset 700 with segmentation according to some embodiments. FIG. 7 will be described prior to the description of FIG. 6B.

FIG. 7 depicts a dataset 700. Dataset 700 may be organized into slots 710 which may correspond to slots 630 of FIG. 6B and/or repetitions 830 of FIG. 8A and FIG. 8B. In some embodiments, dataset 700 may be organized into repetitions 710. For convenience, the term "slots 710" will be used but may refer to slots 710 and/or repetitions 710. Similar to the description of slots above, slots 710 may be used by a UE to transmit PUSCH data. In an embodiment, slots 710 may carry six symbols of data. For example, symbol slot 720A may represent two symbols. Slot 710A may include an allocation of space for three symbols slots 720, such as symbols 720A, 720B, and 720C. Each symbol may have an allocated space to transmit two symbols. In this manner, a nominal repetition may be a length of six symbols. For example, slots 710A, 710B, 710C, and 710D may utilize a repetition length of six symbols. This example embodiment will be further described with reference to FIG. 7, FIG. 6B, FIG. 8A, and FIG. 8B. In some embodiments, the symbol length of slots 710 may be more or less than this indicated length.

In some embodiments, segmentation may occur within a particular slot 710. This segmentation may divide symbols, which may cause the symbols to not be continuous. For example, in slots 710A and 710B, segmentation may occur at symbol slots 720B and 720E. In this manner, symbol 720A may be separated from symbol 720C. Symbol 720D may be separated from symbol 720F. As previously described, this segmentation may occur, for example, due to downlink transmissions and/or boundary crossing.

The effects of the downlink transmissions and/or boundary crossing may also occur at symbol slot 720H. This case, however, may not cause segmentation as the symbols in symbol slot 720G may still be continuous. For example, symbol slot 720G may include four symbols for PUSCH transmission that may be related. Symbol slot 720H may experience degradation and may prevent PUSCH transmissions, but this prevention may not cause segmentation within slot 710C. Similarly, in slot 710D, segmentation may not occur. In this case, symbol slot 720I may include six symbols that may be related. This slot may not experience a prevention of PUSCH transmissions.

Returning to FIG. 6B, block diagram 600B may illustrate an inter-slot frequency hopping scheme for transmitting the symbols 720 depicted in FIG. 7. Block diagram 600B may include two axes. Axis 610 may indicate a frequency scale while axis 620 may indicate a time scale. Block diagram 600B may depict a communication frame and/or may be divided into different slots 630. Slots 630 may correspond to slots 710 as depicted in FIG. 7.

Similar to the inter-slot frequency hopping described with reference to FIG. 6A, a UE may perform frequency hopping on segmented symbols for a PUSCH transmission in a similar manner. For example, the UE may alternate PUSCH transmissions between a first range of transmission frequencies and a second range of transmission frequencies. The first range may correspond to a first central transmission frequency while the second range may correspond to an offset frequency. These ranges may correspond to frequency domain resource allocations.

To illustrate the transmissions of the segmented symbols, the UE may transmit the segmented symbols in slots 630A and 630B. For example, the UE may transmit symbols 645A and 645C using the first range of frequencies. Due to the segmentation caused at symbol slot 645B, the UE may not transmit symbols in this slot. Similarly, in slot 630B, the UE may transmit symbols 645D and 645F using the second range of frequencies. Due to the segmentation caused at symbol slot 645E, the UE may not transmit symbols in this slot. Based on this configuration, the UE may still apply inter-slot frequency hopping to PUSCH transmissions even when symbols become segmented. As previously explained, this inter-slot frequency hopping may aid in providing channel diversity.

Further, this inter-slot frequency hopping may account for frequency hopping in a mixed case where some slots 630 may include segmented symbols while others do not. For example, slots 630C and 630D may include symbols 645 which may not be segmented. For example, in slot 630C, a UE may transmit symbols 645G and 645H despite being prevented from transmitting in symbol slot 645I. Similarly, in slot 630D which may include continuous symbols 645J, the UE may perform this transmission using inter-slot frequency hopping. In this manner, using this inter-slot frequency hopping scheme, the UE may transmit PUSCH communications for segmented and non-segmented symbols.

Similar to FIG. 6A, FIG. 6B may also depict inter-repetition frequency hopping. In this scheme, rather than slots 630A-630D, under inter-repetition frequency hopping, symbols may be transmitted in repetitions 630A-630D. These repetitions may represent a nominal repetition length as will be further described below. In this case, the repetitions 630A-630D may be used to perform inter-repetition frequency hopping without using slots. Similarly, repetitions 630A-630D may be used when symbols are segmented.

For FIG. 6A and FIG. 6B, the following protocols may also be used to further describe the inter-slot frequency hopping. For inter-slot frequency hopping, the same frequency offset may be applied to PUSCH repetitions within a particular slot. This application may include PUSCH segmentation within that slot. The frequency offset may alternate between two values: zero and $RB_{offset}$. The $RB_{offset}$ may be a frequency offset value from the starting transmission frequency. This alternation may be applied for slots with the PUSCH allocation. The starting frequency for a resource block (RB) (i.e., the range of frequencies) for a particular slot $n_s^\mu$ may be given by:

$$RB_{start}(n_s^\mu) = \begin{cases} RB_{start}, & n_s^\mu \bmod 2 = 0 \\ (RB_{start} + RB_{offset}) \bmod N_{BWP}^{size}, & n_s^\mu \bmod 2 = 1 \end{cases}$$

With inter-repetition PUSCH frequency hopping, the frequency offset value may alternate between two values: zero and $RB_{offset}$. In some embodiments, the value "p" may be a PUSCH repetition index where $0 \le p \le P-1$. In this case, the value "P" may be configured by a higher communication layer configured and/or signaled dynamically. The starting RB position for the PUSCH repetition "p" may be given by:

$$RB_{start}(p) = \begin{cases} RB_{start}, & p \bmod 2 = 0 \\ (RB_{start} + RB_{offset}) \bmod N_{BWP}^{size}, & p \bmod 2 = 1 \end{cases}$$

If a PUSCH repetition is segmented, then each segment may follow this formula. In some embodiments, no additional frequency hopping is introduced for segments under one PUSCH repetition.

Figure 8A:
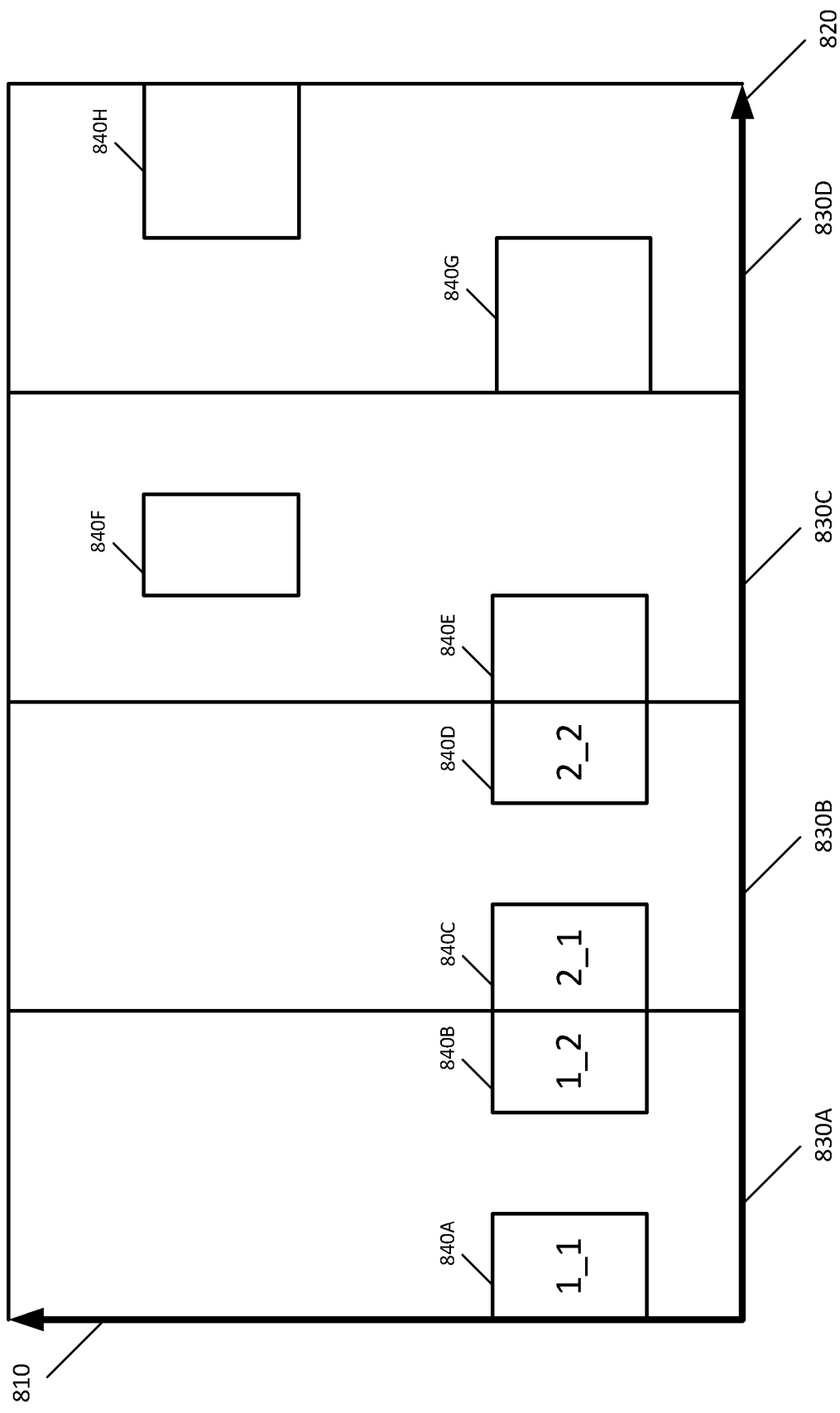
FIG. 8A illustrates a block diagram of intra-repetition frequency hopping for physical uplink shared channel (PUSCH) communications with segmentation according to some embodiments.

FIG. 8A illustrates a block diagram 800A of intra-repetition frequency hopping for physical uplink shared channel (PUSCH) communications with segmentation according to some embodiments. Block diagram 800A may depict an intra-repetition frequency hopping of the dataset 700 depicted in FIG. 7. The intra-repetition frequency hopping may differ from the inter-repetition frequency hopping by performing a division of symbols within a particular repetition 830. Block diagram 800A may include two axes. Axis 810 may indicate a frequency scale while axis 820 may indicate a time scale. Block diagram 800A may depict a communication frame and/or may be divided into different repetitions 830. Repetitions 830 may correspond to slots 710 as depicted in FIG. 7.

Similar to the intra-slot frequency hopping described with reference to FIG. 3B, a UE may perform intra-repetition frequency hopping on symbols for a PUSCH transmission in a similar manner. The UE may divide continuous symbols into different portions and transmit the different portions using different frequency ranges. For example, the UE may alternate PUSCH transmissions within a repetition 830 between a first range of transmission frequencies and a second range of transmission frequencies. The first range may correspond to a first central transmission frequency and a first divided portion of symbols while the second range may correspond to an offset frequency and a second divided portion of symbols. These ranges may correspond to frequency domain resource allocations.

If symbols are segmented within a repetition 830, however, the intra-repetition frequency hopping may be disabled for that particular repetition 830. The segmented symbols may be transmitted using the same range of frequencies within the repetition 830. This disabling may aid in preventing resource fragmentation in view of the segmentation. For example, the disabling may reduce complexities with the PUSCH transmission and reception of the symbols.

To illustrate an example embodiment, repetitions 830 may be used by the UE to transmit dataset 700 as depicted in FIG. 7. In repetition 830A, symbols 840A and 840B may be segmented. In this case, the UE my disable the intra-repetition frequency hopping. Symbols 840A and 840B may then be transmitted using the same transmission frequency and/or the same range of frequencies. Similarly, in repetition 830B, symbols 840C and 840D may be segmented. Symbols 840C and 840D may be transmitted using the same transmission frequency. Symbols 840A, 840B, 840C, and 840D may be transmitted using the same transmission frequency. In this manner, the intra-repetition frequency hopping may be used. In some embodiments, the intra-repetition frequency hopping may be combined with the inter-slot and/or inter-repetition frequency hopping. Repetitions 830A and 830B may be transmitted using different transmission frequencies and/or different ranges of frequencies.

In contrast to these segmented symbols, repetitions 830C and 830D depict symbols 840 which may be non-segmented. In these cases, the UE may apply intra-repetition frequency hopping to the symbols to achieve channel diversity. For example, in repetition 830C, symbol 840E and 840F may be transmitted using different ranges of frequencies. As previously explained, although repetition 830C may include a portion where the UE may not be able to perform a PUSCH transmission, this portion may not segment symbols 840E and 840F. Because symbols 840E and 840F are not segmented, the UE may perform intra-repetition frequency hopping on these symbols.

Similarly, repetition 830D may include symbols 840G and 840H. These symbols may be non-segmented. In this case, the UE may divide the symbols into different portions and transmit the different portions using different transmission frequencies and/or different ranges of frequencies. In some embodiments, symbols 840G and 840H may be a different length of symbols than symbols 840E and 840F. For example, symbols 840G and 840H may each be a length of three symbols while symbols 840E and 840F may each be a length of two symbols. As previously explained, this intra-repetition frequency hopping configuration may provide a balance of complexity and possible resource fragmentation while still allowing for channel diversity in PUSCH transmissions.

For FIG. 8A, the following protocols may also be used to further describe the intra-repetition frequency hopping. With intra-repetition PUSCH repetitions, each PUSCH repetition which is not segmented may be divided into two hops. The number of symbols in the first hop may be given by:

$$\lfloor N_{symb}^{PUSCH,s}/2 \rfloor$$

The number of symbols in the second hop may be given by:

$$N_{symb}^{PUSCH,s} - \lfloor N_{symb}^{PUSCH,s}/2 \rfloor$$

where $N_{symb}^{PUSCH,s}$ is the length of the PUSCH transmission in OFDM symbols in one PUSCH repetition.

The starting resource block (RB) in each hop may be given by:

$$RB_{start} = \begin{cases} RB_{start} & i=0 \\ (RB_{start} + RB_{offset}) \bmod N_{BWP}^{size} & i=1 \end{cases}$$

For a PUSCH repetition which is segmented, to avoid the definition of a convolved hopping scheme, the starting RB may be fixed to $RB_{start}$ and/or $(RB_{start}+RB_{offset}) \bmod N_{BWP}^{size}$.

While intra-repetition PUSCH frequency hopping may be disabled for segmentation, in some embodiments, intra-PUSCH hopping may be disabled if the length of a PUSCH segment is smaller than a threshold. For example, the threshold may be two symbols. To illustrate an example, while a portion of repetition 830C prevented PUSCH transmissions, if this portion prevented PUSCH transmissions to a state where the available symbols fell below a threshold, the intra-repetition frequency hopping may be disabled for repetition 830C.

Figure 8B:
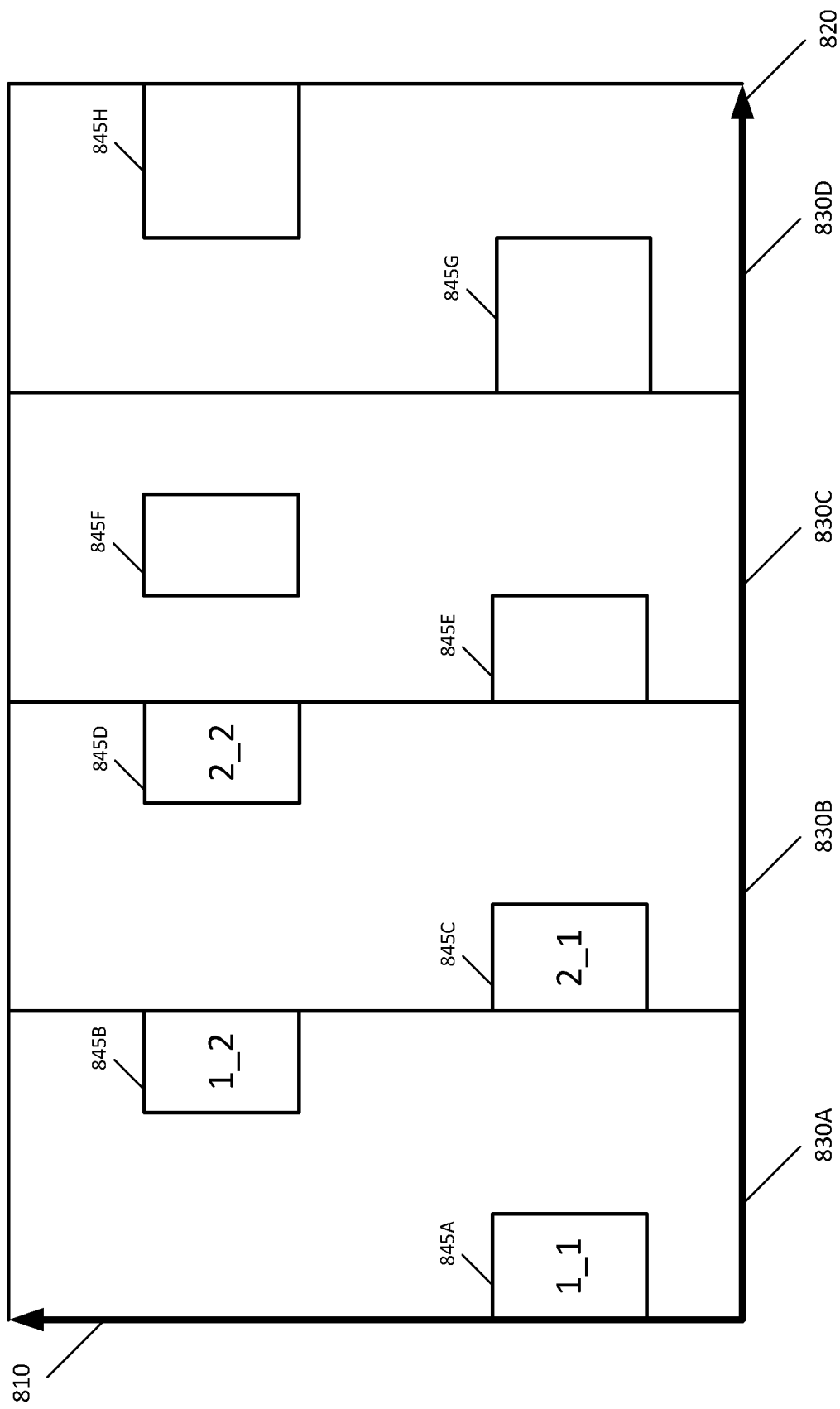
FIG. 8B illustrates a block diagram of intra-repetition frequency hopping for physical uplink shared channel (PUSCH) communications based on length according to some embodiments.

For example, in some embodiments with intra-repetition frequency hopping, when a nominal repetition is mapped into one or multiple actual repetition, the number of symbols in an actual repetition may be compared with a threshold X, if the number of symbols in the actual repetition is not less than X, then the actual repetition is divided into two portions, with floor (X/2) symbols in the first portion, and ceil (X/2) symbols in the second portion. The first portion starts from the starting RB, and the second portion starts from the starting RB modified by an offset. Symbols 840E, 840F, 840G, and 840H may depict this intra-repetition frequency hopping based on length. If the number of symbols in the actual repetition is less than X, then all the symbols in the actual repetition starts from the same frequency location, which can be either the starting RB or the starting RB modified by an offset. Repetitions 830A and 830B depict this embodiment where symbols 840A, 840B, 840C, and 840D fall below the threshold. The threshold X may depend on L; and X may be the same as L FIG. 8B illustrates a block diagram 800B of intra-repetition frequency hopping for physical uplink shared channel (PUSCH) communications based on length according to some embodiments. Block diagram 800B may depict an intra-repetition frequency hopping of the dataset 700 depicted in FIG. 7. Block diagram 800B may include two axes. Axis 810 may indicate a frequency scale while axis 820 may indicate a time scale. Block diagram 800B may depict a communication frame and/or may be divided into different repetitions 830. Repetitions 830 may correspond to slots 710 as depicted in FIG. 7.

In some embodiments, block diagram 800B may depict an embodiment where symbols 845A, 845B, 845C, and/or 845D meet and/or exceed a threshold based on length of symbols. For example, in this case, the threshold may be set at two symbols while symbols 845A, 845B, 845C, and/or 845D have a length of two symbols. In this case, symbols 845A, 845B, 845C, and/or 845D may be divided and transmitted using intra-repetition frequency hopping within repetitions 830A and 830B. Similarly for repetitions 830C and 830D, symbols 845E, 845F, 845G, and/or 845H may meet this threshold. These symbols may then be transmitted using intra-repetition frequency hopping due to meeting the threshold.

As previously explained, in some embodiments, with intra-repetition frequency hopping, when a nominal repetition is mapped into one or multiple actual repetitions, the number of symbols 845 in an actual repetition is compared with a threshold X, if the number of symbols 845 in the actual repetition is not less than X, then the actual repetition is divided into two portions, with floor (X/2) symbols 845 in the first portion, and ceil (X/2) symbols 845 in the second portion. The first portion starts from the starting RB, and the second portion starts from the starting RB modified by an offset. In some embodiments, when the number of symbols 845 in an actual repetition is less than X, or one nominal repetition results in two or more actual repetitions, all the symbols 845 in an actual repetition start from the same frequency location. This embodiment is depicted in FIG. 8A. To determine the frequency location where all the symbols in an actual repetition start, denote the symbols with indices {1, 2, . . . , L} for symbols in a nominal repetition. The indices are divided into two sets, for example {1, . . . , floor (L/2)} and {floor (L/2)+1, . . . , L}. If an actual repetition contains a symbol with a symbol index belonging to the first set, then all the symbols in the actual repetition start from one frequency location (e.g. the starting RB). If an actual repetition has no symbol with an index belonging to the first set, then the actual repetition starts from another frequency location (e.g the starting RB modified by an offset). Alternatively, the test can be performed with the second set. If an actual repetition contains a symbol with symbol index belonging to the second set, then all the symbols in the actual repetition starts from one frequency location (e.g. the starting RB modified by an offset). If an actual repetition has no symbol with an index belonging to the second set, then the actual repetition starts from another frequency location (.e.g the starting RB).

Figure 9A:
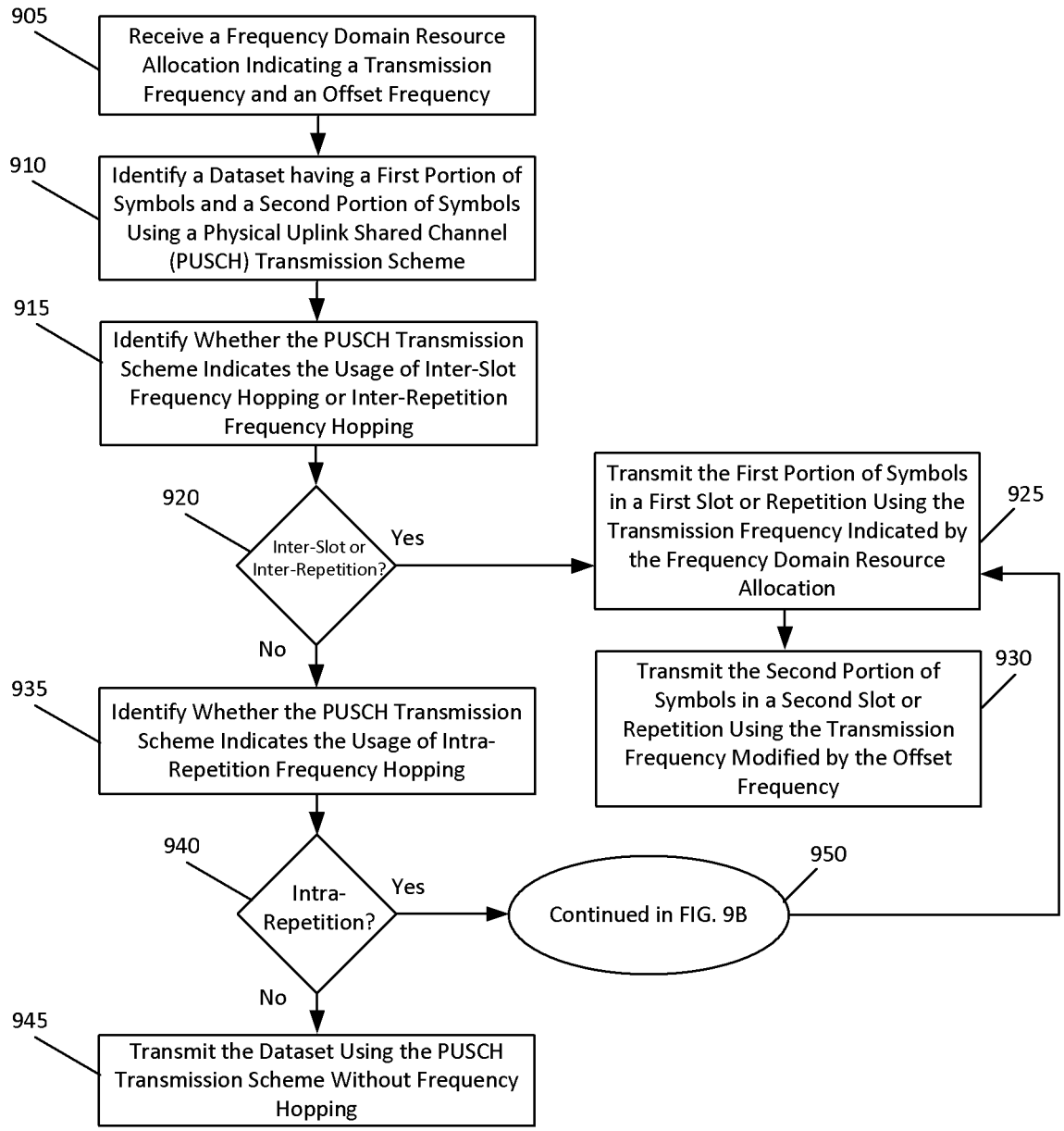
FIG. 9A illustrates a flowchart for PUSCH frequency hopping communications according to some embodiments.

FIG. 9A illustrates a flowchart 900A for PUSCH frequency hopping communications according to some embodiments. In some embodiments, a UE such as UE 110 and/or wireless system 200 may execute flowchart 900A. In some embodiments, UE 110 may transmit PUSCH data to a RAN node 120 using flowchart 900A. Flowchart 900A shall be described with reference to UE 110; however, flowchart 900A is not limited to that example embodiment. Flowchart 900A may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 9A, as will be understood by a person of ordinary skill in the art.

At 905, UE 110 may receive a frequency domain resource allocation indicating a transmission frequency and an offset frequency. For example, UE 110 may receive the frequency domain resource allocation from a RAN node 120. The frequency domain resource allocation may indicate a first range of frequencies centered on the transmission frequency. Similarly, the frequency domain resource allocation may indicate a second range of frequencies centered on the offset frequency. In some embodiments, the offset frequency may represent a modification of the transmission frequency to translate the first range of frequencies to the second range of frequencies.

At 910, the UE 110 may identify a dataset having a first portion of symbols and a second portion of symbols using a physical uplink shared channel (PUSCH) transmission scheme. This PUSCH dataset may be information and/or control data being transmitted by the UE 110 to a RAN node 120. The dataset may be divided into slots and/or repetitions of symbols. In some embodiments, each slot and/or repetition may be the same length of symbols.

At 915, the UE 110 may identify whether the PUSCH transmission scheme indicates the usage of inter-slot frequency hopping or inter-repetition frequency hopping. In some embodiments, UE 110 may be commanded by RAN node 120 to use inter-slot frequency hopping or inter-repetition frequency hopping. In some embodiments, UE 110 and RAN node 120 may exchange control information to designate the use of inter-slot frequency hopping or inter-repetition frequency hopping. This exchange may occur prior to the PUSCH transmission. At 920, the UE 110 may determine whether to use inter-slot frequency hopping or inter-repetition frequency hopping to transmit the dataset.

If inter-slot frequency hopping is used, at 925, the UE 110 may transmit the first portion of symbols in a first slot using the transmission frequency indicated by the frequency domain resource allocation. At 930, the UE 110 may transmit the second portion of symbols in a second slot using the transmission frequency modified by the offset frequency. This transmission was previously described with reference to FIG. 6A and FIG. 6B. The inter-slot frequency hopping may be employed if the symbols are segmented and/or non-segmented. In some embodiments, the slots may continue alternating between the transmission frequency and the transmission frequency modified by the offset frequency to transmit the symbols of the dataset.

Similarly, if inter-repetition frequency hopping is used, at 925, the UE 110 may transmit the first portion of symbols in a first transmission repetition using the transmission frequency indicated by the frequency domain resource allocation. At 930, the UE 110 may transmit the second portion of symbols in a second transmission repetition using the transmission frequency modified by the offset frequency. This transmission was previously described with reference to FIG. 6A and FIG. 6B. The inter-repetition frequency hopping may be employed if the symbols are segmented and/or non-segmented. In some embodiments, the repetitions may continue alternating between the transmission frequency and the transmission frequency modified by the offset frequency to transmit the symbols of the dataset.

Returning to 920, if inter-slot or inter-repetition frequency hopping is not used, the UE 110 may identify whether the PUSCH transmission scheme indicates the usage of intra-repetition frequency hopping. In some embodiments, UE 110 may be commanded by RAN node 120 to use intra-repetition frequency hopping. In some embodiments, UE 110 and RAN node 120 may exchange control information to designate the user of intra-repetition frequency hopping. This exchange may occur prior to the PUSCH transmission. At 940, UE 110 may determine whether to use intra-repetition frequency hopping to transmit the dataset.

At 950, UE 110 may performed intra-repetition frequency hopping for the PUSCH transmissions. The use of intra-repetition frequency hopping will be further described with reference to FIG. 9B. If UE 110 does not perform intra-repetition frequency hopping, at 945, UE 110 may transmit the dataset using the PUSCH transmission scheme without frequency hopping.

Figure 9B:
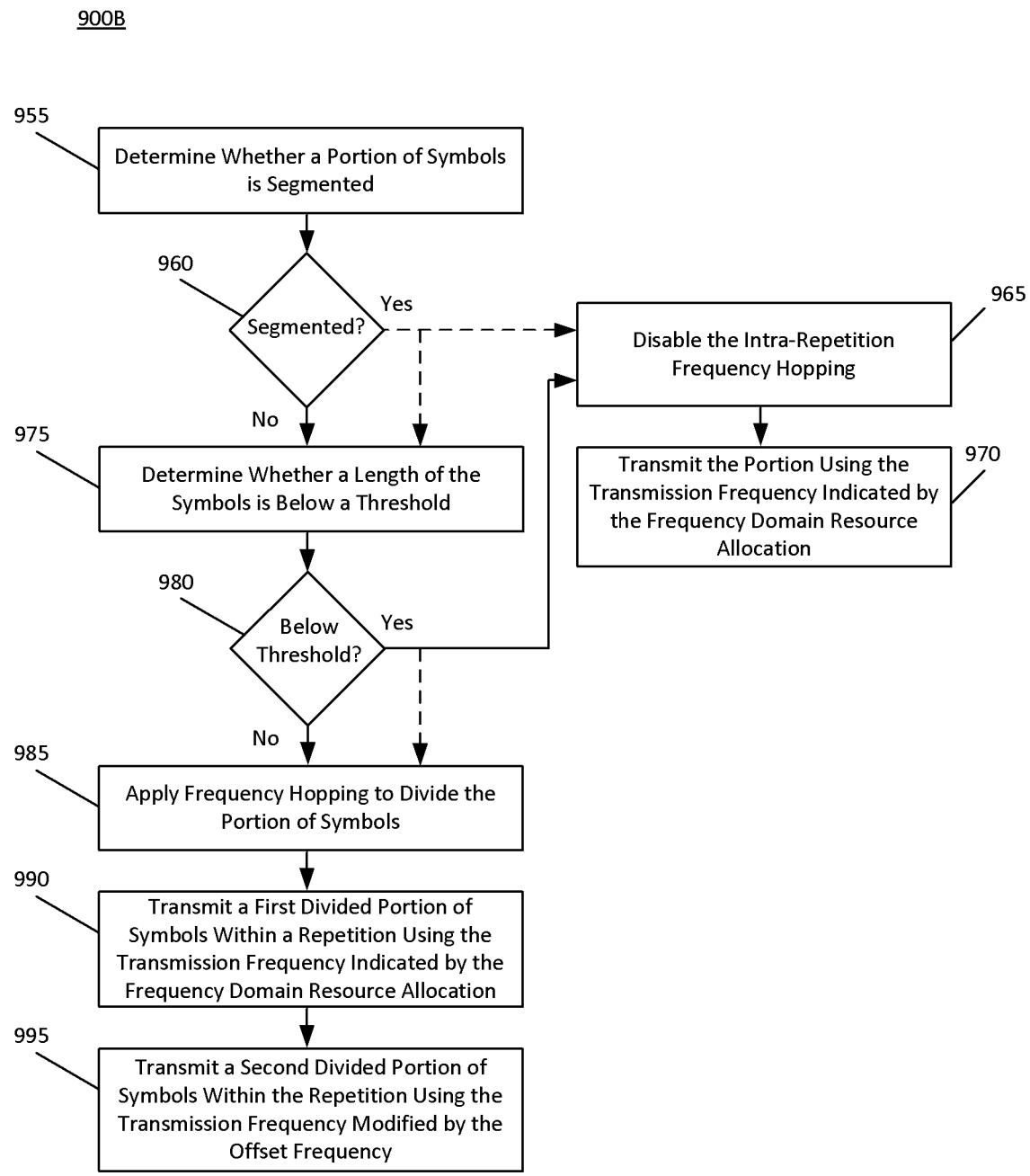
FIG. 9B illustrates a flowchart for intra-repetition frequency hopping for physical uplink shared channel (PUSCH) communications with segmentation according to some embodiments.

FIG. 9B illustrates a flowchart 900B for intra-repetition frequency hopping for physical uplink shared channel (PUSCH) communications with segmentation according to some embodiments. In some embodiments, a UE such as UE 110 and/or wireless system 200 may execute flowchart 900B. In some embodiments, UE 110 may transmit PUSCH data to a RAN node 120 using flowchart 900B. Flowchart 900B shall be described with reference to UE 110; however, flowchart 900B is not limited to that example embodiment. Flowchart 900B may be executed on any computing device, such as, for example, the computer system described with reference to FIG. 10 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 9B, as will be understood by a person of ordinary skill in the art.

UE 110 may execute flowchart 900B as a continuation of flowchart 900A as described with reference to FIG. 9A. The flowchart 900B may illustrate a flow for transmitting the intra-repetition frequency hopping described with reference to FIG. 8A and/or FIG. 8B. At 955, UE 110 may determine whether a portion of symbols is segmented. For example, the segmentation of the symbols may be similar to the segmentation described with reference to FIG. 4, FIG. 5, FIG. 7, FIG. 8A, and FIG. 8B. This segmentation of symbols may identified for each slot and/or repetition of symbols being transmitted by UE 110. At 960, UE 110 may determine whether the symbols are segmented.

At 965, if the symbols are segmented, UE 110 may disable the intra-repetition frequency hopping. In some embodiments, UE 110 may not apply intra-repetition frequency hopping to the symbols in a particular repetition. In some embodiments, UE 110 may also disable the intra-repetition frequency hopping if a number of symbols within a repetition is below a threshold number of symbols. As will be further explained below, UE 110 may determine at 975 and 980 whether a length of the symbols is below a threshold. In this case, UE 110 may disable the intra-repetition frequency hopping at 965. In either case, the portion of symbols that may have been segmented may not be transmitted using intra-repetition frequency hopping.

At 970, UE 110 may transmit the portion using the transmission frequency indicated by the frequency domain resource allocation. Referring to FIG. 9A, each portion of segmented symbols may be evaluated at 950. These portions may correspond to transmission repetitions as previously described with reference to FIG. 8A. When symbols are segmented, the segmented symbols may be transmitted using a particular transmission frequency and/or a range of frequencies without applying frequency hopping within the repetition. In some embodiments, inter-repetition frequency hopping may be combined with the intra-repetition frequency hopping. In this case, UE 110 may execute 925 and 930 to transmit the portions of the dataset using different repetition with inter-repetition frequency hopping.

Returning to 960, if a portion of symbols in a repetition is non-segmented and/or continuous, UE 110 may determine whether a length of the symbols is below a threshold. In some embodiments, even if the symbols are segmented, UE 110 may perform this determination as previously explained with reference to FIG. 8B. For example, in some embodiments, the length of the symbols may determine whether to apply intra-repetition frequency hopping. In this case, even if symbols are segmented, intra-repetition frequency hopping may still be applied depending on the configuration of UE 110. At 980, if UE 110 determines that the length of the symbols is below a threshold, UE 110 may be return to 965 to disable the intra-repetition frequency hopping and may perform the transmission at 970.

At 980, if UE 110 determines that the length of the symbols is not below a threshold (e.g., the length meets and/or exceeds the threshold), UE 110 may apply frequency hopping to divide the portion of symbols at 985. This intra-repetition division was previously described with reference to FIG. 8A and FIG. 8B. UE 110 may divide the symbols into a first divided portion and a second divided portion to transmit within a repetition. In some embodiments, the determination of segmentation and/or the threshold length may be optional elements. For example, the determination of whether to apply intra-repetition frequency hopping may be based on segmentation and/or a length threshold. In this manner, the determination of whether to apply intra-repetition frequency hopping is not limited to applying both determination mechanisms. In some embodiments, 975 and/or 980 may be bypassed. For example, 975 and/or 980 may be optional elements of flowchart 900B. In this case, the determination of whether to apply intra-repetition frequency hopping may be based on whether a portion of the symbols are segmented.

At 990, UE 110 may transmit a first divided portion of symbols within a repetition using the transmission frequency indicated by the frequency domain resource allocation. At 995, UE 110 may transmit a second divided portion of symbols within the repetition using the transmission frequency modified by the offset frequency. In this case, UE 110 may perform intra-repetition frequency hopping for these divided portions.

In some embodiments, if additional data from the dataset is to be transmitted, UE 110 may repeat elements of flowcharts 900A and 900B to transmit the data using inter-slot frequency hopping, inter-repetition frequency hopping, intra-repetition frequency hopping, and/or neither. A RAN node 120 may change a selected frequency hopping scheme. The RAN node 120 may also change the frequency domain resource allocation and change the transmission frequency and/or offset frequency. In some embodiments, this change may change the range of frequencies corresponding to the transmission frequency and/or the range of frequencies corresponding to the offset frequency. Using the inter-slot, inter-repetition, and/or intra-repetition frequency hopping described herein, UE 110 and/or other communication systems may provide frequency hopping for PUSCH transmissions to provide channel diversity while avoiding potential resource fragmentation.

As previously explained, elements of flowcharts 900A and/or 900B may be optional and/or may not be performed. For example, if a RAN node 120 transmits a command to UE 110 to use a particular transmission scheme (e.g., inter-slot, inter-repetition, and/or intra-repetition frequency hopping), UE 110 may avoid the elements of checking to determine which frequency hopping scheme to use. UE 110 may bypass, for example, elements 915, 920, 935, and/or 940. In some embodiments, however, UE 110 may perform this determination based on an analysis of transmission parameters.

Figure 10:
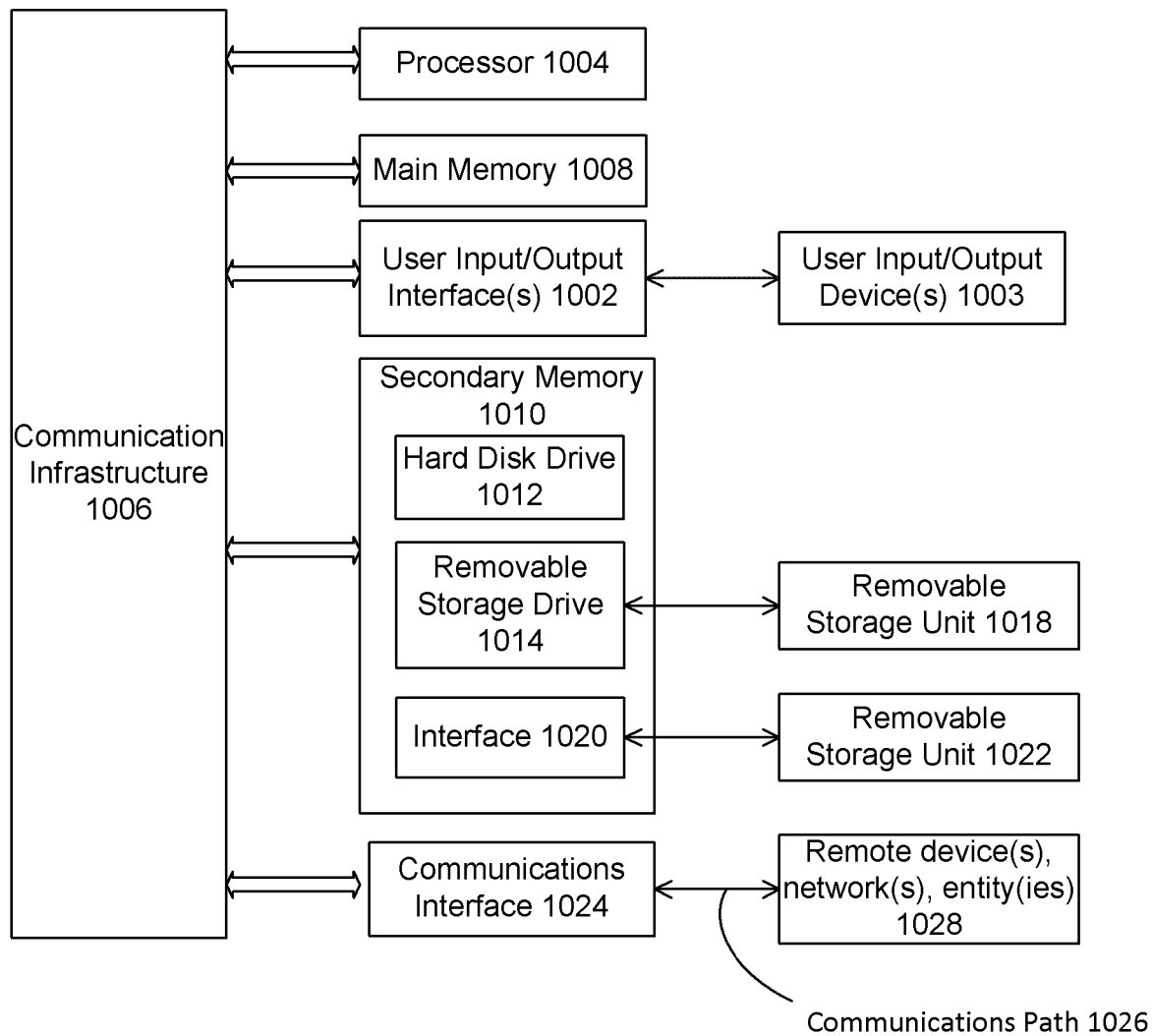
FIG. 10 depicts an example computer system useful for implementing various embodiments.

FIG. 10 depicts an example computer system useful for implementing various embodiments. Various embodiments may be implemented, for example, using one or more well-known computer systems, such as computer system 1000 shown in FIG. 10. One or more computer systems 1000 may be used, for example, to implement any of the embodiments discussed herein, as well as combinations and subcombinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A method, comprising:
   receiving a frequency domain resource allocation indicating a transmission frequency and an offset frequency;
   identifying a dataset having symbols using a Physical Uplink Shared Channel (PUSCH) transmission scheme;
   identifying that the PUSCH transmission scheme indicates usage of intra-repetition frequency hopping;
   determining whether the symbols are non-segmented;
   in response to determining that the symbols are segmented, disabling the intra-repetition frequency hopping;
   in response to determining that the symbols are non-segmented, determining whether a length of the symbols meets a symbol length threshold;
   in response to determining that the length meets the symbol length threshold, dividing the symbols into a first divided portion and a second divided portion for the intra-repetition frequency hopping;
   transmitting the first divided portion of symbols in a transmission repetition using the transmission frequency; and
   transmitting the second divided portion of symbols in the transmission repetition using the offset frequency.

2. The method of claim 1, further comprising:
   identifying a second dataset using an intra-repetition frequency hopping PUSCH transmission scheme;
   determining that the second dataset includes segmented symbols;
   disabling the intra-repetition frequency hopping; and
   transmitting the second dataset using the transmission frequency indicated by the frequency domain resource allocation.

3. The method of claim 1, further comprising:
identifying a second dataset having a first portion of symbols and a second portion of symbols using an inter-slot frequency hopping PUSCH transmission scheme;
determining that the first portion and the second portion are segmented;
transmitting the first portion in a first transmission slot using the transmission frequency; and
transmitting the second portion in a second transmission slot using the offset frequency.

4. The method of claim 1, further comprising:
identifying a second dataset having a first portion of symbols and a second portion of symbols using an inter-slot frequency hopping PUSCH transmission scheme;
determining that the first portion and the second portion are non-segmented;
transmitting the first portion in a first transmission slot using the transmission frequency; and
transmitting the second portion in a second transmission slot using the offset frequency.

5. The method of claim 1, wherein transmitting using the offset frequency further comprises:
modifying the transmission frequency by translating the transmission frequency using the offset frequency.

6. The method of claim 1, wherein the frequency domain resource allocation indicates a first range of frequencies corresponding to the transmission frequency and a second range of frequencies corresponding to the offset frequency.

7. The method of claim 1, further comprising:
alternating between the transmission frequency and the offset frequency to transmit additional PUSCH data.

8. A wireless communication system, comprising:
a transceiver; and
at least one processor coupled to the transceiver, wherein the at least one processor is configured to:
receive a frequency domain resource allocation indicating a transmission frequency and an offset frequency;
identify a dataset having symbols using a Physical Uplink Shared Channel (PUSCH) transmission scheme;
identify that the PUSCH transmission scheme indicates usage of intra-repetition frequency hopping;
determine whether the symbols are non-segmented;
in response to determining that the symbols are segmented, disable the intra-repetition frequency hopping;
in response to determining that the symbols are non-segmented, determine whether a length of the symbols meets a symbol length threshold;
in response to determining that the length meets the symbol length threshold, divide the symbols into a first divided portion and a second divided portion for the intra-repetition frequency hopping;
transmit, via the transceiver, the first divided portion of symbols in a first transmission repetition using the transmission frequency; and
transmit, via the transceiver, the second divided portion of symbols in a second transmission repetition using the offset frequency.

9. The wireless communication system of claim 8, wherein the at least one processor is further configured to:
identify a second dataset using an intra-repetition frequency hopping PUSCH transmission scheme;
determine that the second dataset includes segmented symbols;
disable the intra-repetition frequency hopping; and
transmit the second dataset using the transmission frequency indicated by the frequency domain resource allocation.

10. The wireless communication system of claim 8, wherein the at least one processor is further configured to:
identify a second dataset having a first portion of symbols and a second portion of symbols using an inter-slot frequency hopping PUSCH transmission scheme;
determine that the first portion and the second portion are segmented;
transmit the first portion in a first transmission slot using the transmission frequency; and
transmit the second portion in a second transmission slot using the offset frequency.

11. The wireless communication system of claim 8, wherein the at least one processor is further configured to:
identify a second dataset having a first portion of symbols and a second portion of symbols using an inter-slot frequency hopping PUSCH transmission scheme;
determine that the first portion and the second portion are non-segmented;
transmit the first portion in a first transmission slot using the transmission frequency; and
transmit the second portion in a second transmission slot using the offset frequency.

12. The wireless communication system of claim 8, wherein to transmit using the offset frequency, the at least one processor is further configured to:
modify the transmission frequency by translating the transmission frequency using the offset frequency.

13. The wireless communication system of claim 8, wherein the frequency domain resource allocation indicates a first range of frequencies corresponding to the transmission frequency and a second range of frequencies corresponding to the offset frequency.

14. The wireless communication system of claim 8, wherein the at least one processor is further configured to:
alternate between the transmission frequency and the offset frequency to transmit additional PUSCH data.

15. A method, comprising:
transmitting, from a base station to a user equipment (UE), a frequency domain resource allocation indicating a transmission frequency and an offset frequency corresponding to a Physical Uplink Shared Channel (PUSCH) transmission scheme that divides a dataset having symbols into portions for frequency hopping when the symbols are non-segmented and when, in response to the symbols being non-segmented, a length of the symbols meets a symbol length threshold;
receiving, at the base station and from the UE, a first divided portion of symbols from a transmitted dataset using the transmission frequency; and
receiving, at the base station and from the UE, a second divided portion of symbols from the transmitted dataset using the offset frequency.

16. The method of claim 15, wherein the frequency hopping is an intra-repetition frequency hopping PUSCH transmission scheme, the method further comprising:
receiving the first divided portion of symbols in a transmission repetition using the transmission frequency; and
receiving the second divided portion of symbols in the transmission repetition using the offset frequency.

17. The method of claim 15, wherein the frequency hopping is an intra-repetition frequency hopping PUSCH transmission scheme, the method further comprising:
- receiving a second dataset via the transmission frequency in response to a disabled intra-repetition frequency hopping PUSCH transmission scheme based on segmented symbols of the second dataset being segmented.

18. The method of claim 15, further comprising:
- receiving the first divided portion of symbols in a first transmission repetition using the transmission frequency; and
- receiving the second divided portion of symbols in a second transmission repetition using the offset frequency.

19. The method of claim 15, wherein the frequency domain resource allocation indicates a first range of frequencies corresponding to the transmission frequency and a second range of frequencies corresponding to the offset frequency.

20. The method of claim 15, further comprising:
- receiving additional PUSCH data from alternating UE transmissions using the transmission frequency and the offset frequency.

* * * * *